US005522125A

United States Patent [19]
Bradtmueller et al.

[11] Patent Number: 5,522,125
[45] Date of Patent: Jun. 4, 1996

[54] METHOD FOR MAKING ARMATURES FOR ELECTRODYNAMIC MACHINES

[75] Inventors: Lynn E. Bradtmueller, Fort Wayne; Gustave F. Wiedemann, New Haven; David M. Pierre; Ronnie G. Smitley, both of Fort Wayne, all of Ind.

[73] Assignee: General Electric Company, Fort Wayne, Ind.

[21] Appl. No.: 304,007

[22] Filed: Sep. 9, 1994

Related U.S. Application Data

[62] Division of Ser. No. 830,103, Feb. 3, 1992, Pat. No. 5,363,546.

[51] Int. Cl.⁶ .............................. H02K 15/085
[52] U.S. Cl. .................. 29/598; 29/564.1; 29/736
[58] Field of Search .................. 29/596–598, 732, 29/736, 564.1, 564.6, 564.8

[56] References Cited

U.S. PATENT DOCUMENTS

| | | |
|---|---|---|
| Re. 16,823 | 12/1927 | Apple . |
| 1,544,623 | 7/1925 | Apple . |
| 1,555,931 | 10/1925 | Apple . |
| 1,556,891 | 10/1925 | Ahlers et al. . |
| 1,556,892 | 10/1925 | Ahlers et al. . |
| 1,556,893 | 10/1925 | Ahlers et al. . |
| 1,661,344 | 3/1928 | Poole . |
| 1,690,336 | 11/1928 | Elsey . |
| 1,703,188 | 2/1929 | Elsey . |
| 3,911,563 | 10/1975 | Anderson ............................... 29/597 |
| 4,207,669 | 6/1980 | Andrev et al. ......................... 29/564.5 |
| 4,437,230 | 3/1984 | Greutmann .............................. 29/597 |
| 4,449,289 | 5/1984 | Kindig ................................. 29/792 X |
| 4,489,764 | 12/1984 | Walker .................................. 140/92.1 |
| 4,553,321 | 11/1985 | Zihlmann et al. ....................... 29/598 |

FOREIGN PATENT DOCUMENTS

| | | |
|---|---|---|
| 125610 | 3/1959 | U.S.S.R. . |
| 277921 | 8/1965 | U.S.S.R. . |

OTHER PUBLICATIONS

Cambridge Dynamics Limited Brochure—Stonehill Stukeley Road Industrial Estate–Huntingdon–Cambs PE 18 6HZ—Hairpin Forming Machine.

*Primary Examiner*—Carl E. Hall
*Attorney, Agent, or Firm*—Ralph E. Krisher, Jr.

[57] ABSTRACT

An operator sequentially inserts into an automated system for making armatures for electrodynamic machines loaded magazines containing a required number of hairpin conductors for an armature to be made, an armature core comprising a plurality of substantially aligned laminations preassembled to form the core and a commutator, and removes armatures completed by assembling these components. All the insertion and removal steps are performed from an operator's position such that operation of the system embodying the present invention is easily and conveniently performed even though the components and completed armatures can be of substantial weight. The use of a hairpin magazine, including the hairpin conductors required for an armature, permits simultaneous transfer of all the hairpin conductors into upper twist tooling wherein upper ends of the hairpin conductors adjacent end turn portions of the conductors are moved apart relative to one another. The frog leg conductors thus formed are removed from the upper twist tooling and inserted into slots of an armature core which has been earlier inserted into the system. The frog leg conductors are fully pressed through the armature core into lower twist tooling which then is operated to move the ends of the conductors extending beyond the armature core away from one another and into alignment with other conductors for insertion into a commutator for the armature, which commutator was earlier placed into the system. The commutator is properly positioned beneath the armature core which is then pressed onto the commutator. The completed armature is moved to the operator's position where the operator removes the completed armature and replaces it with a commutator for the next armature. The operator continues to insert components of armatures into the system and removes completed armatures made up by assembling the components so inserted.

22 Claims, 26 Drawing Sheets

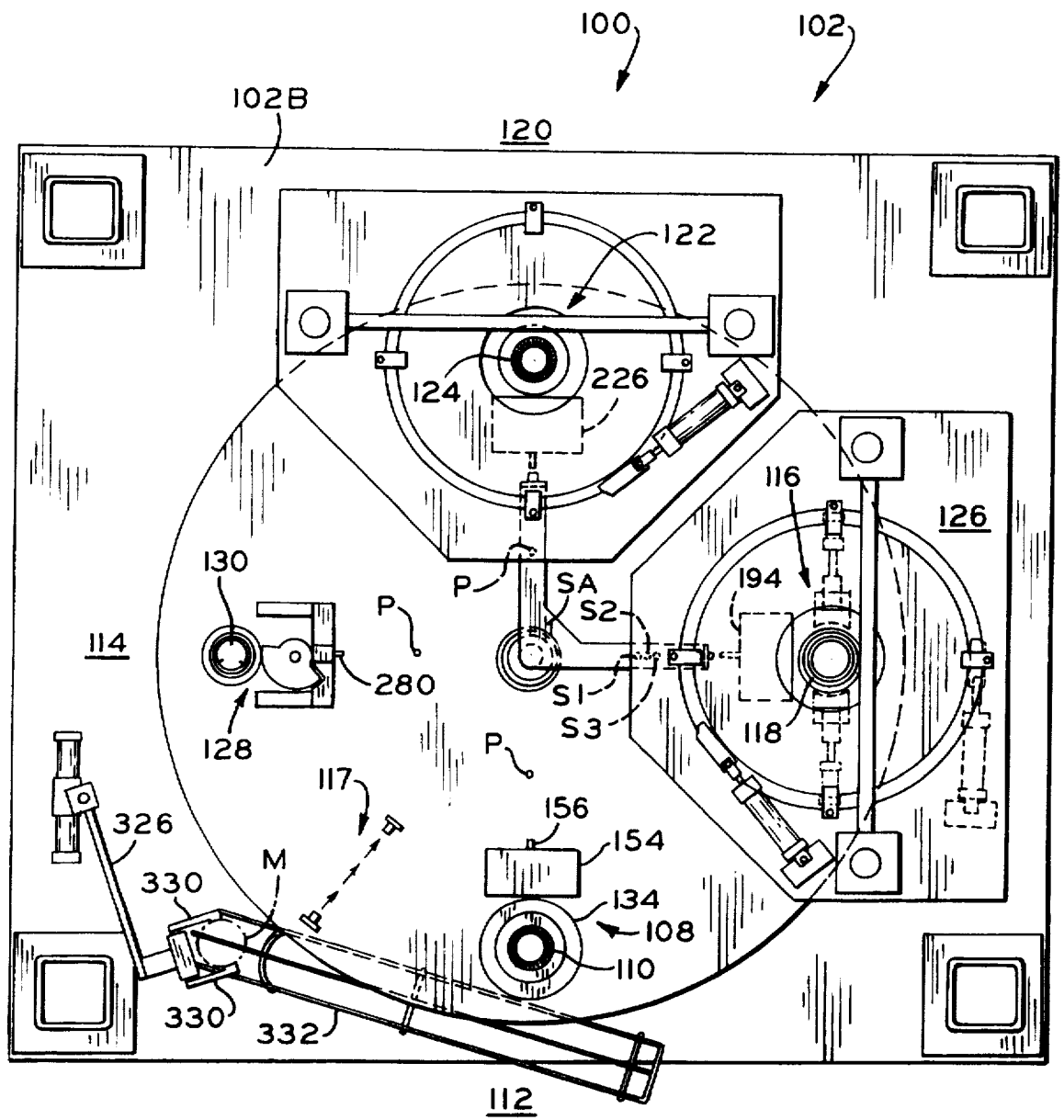
FIG_3

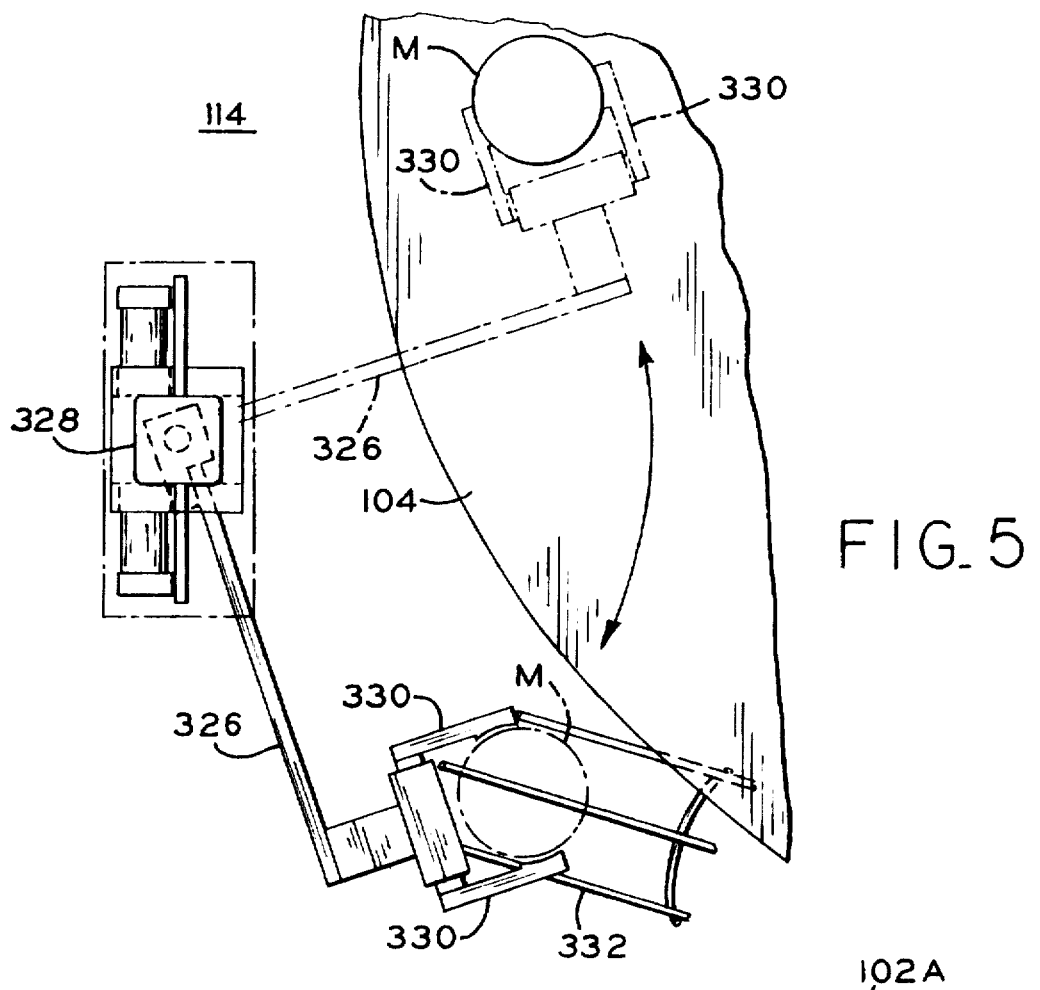
FIG_5
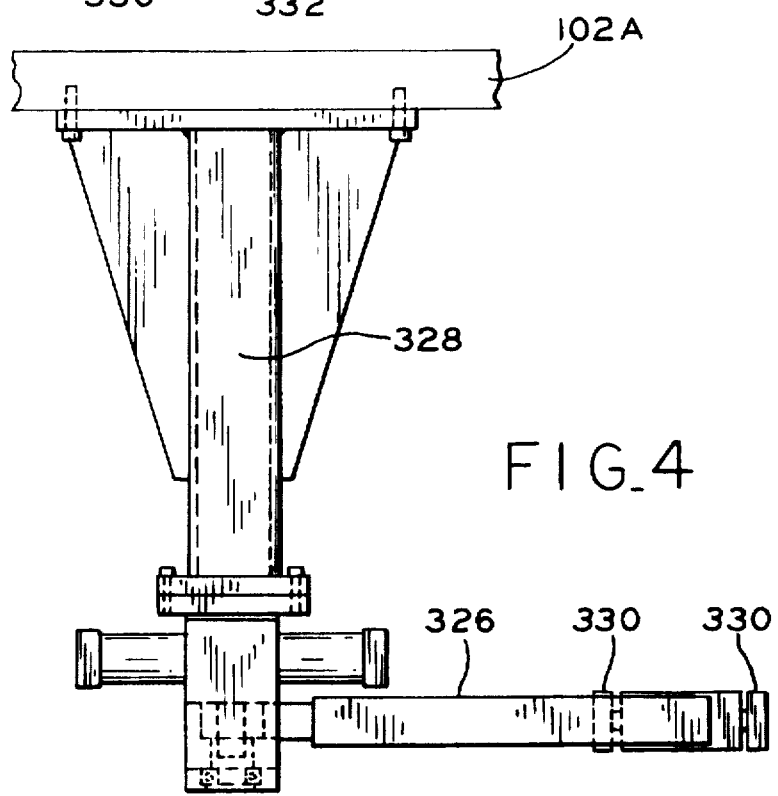
FIG_4

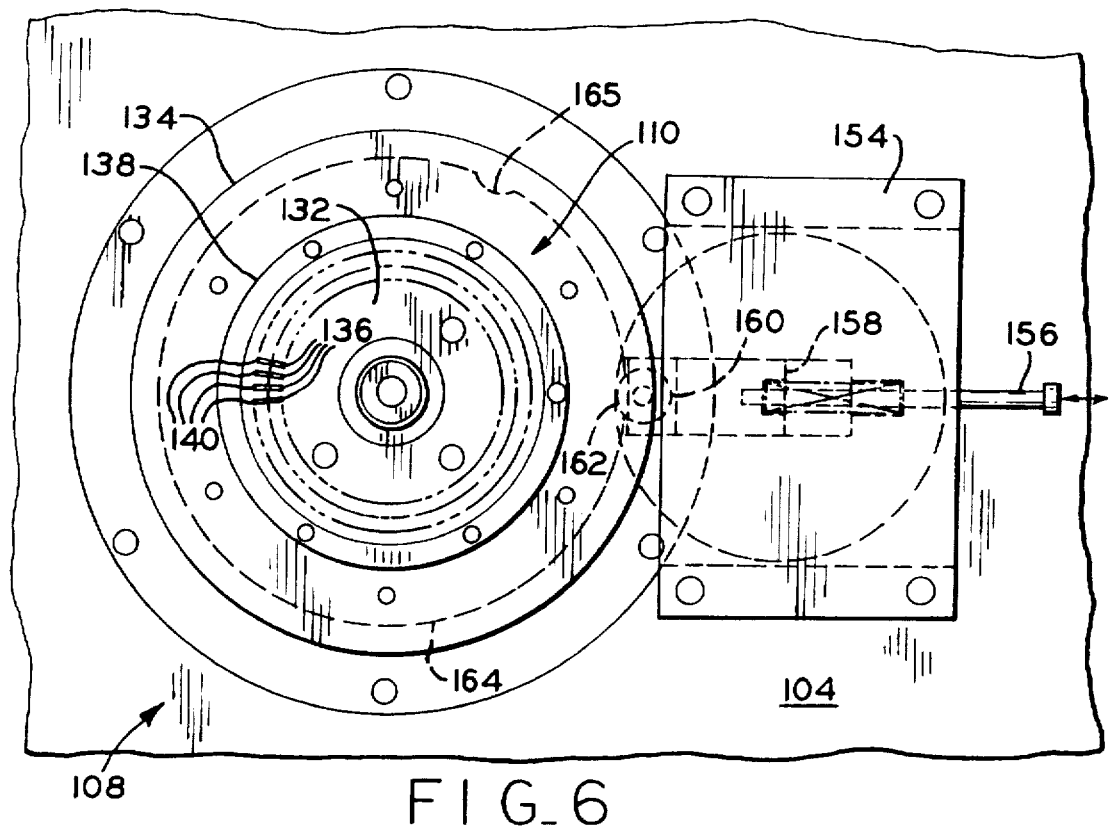
FIG_6
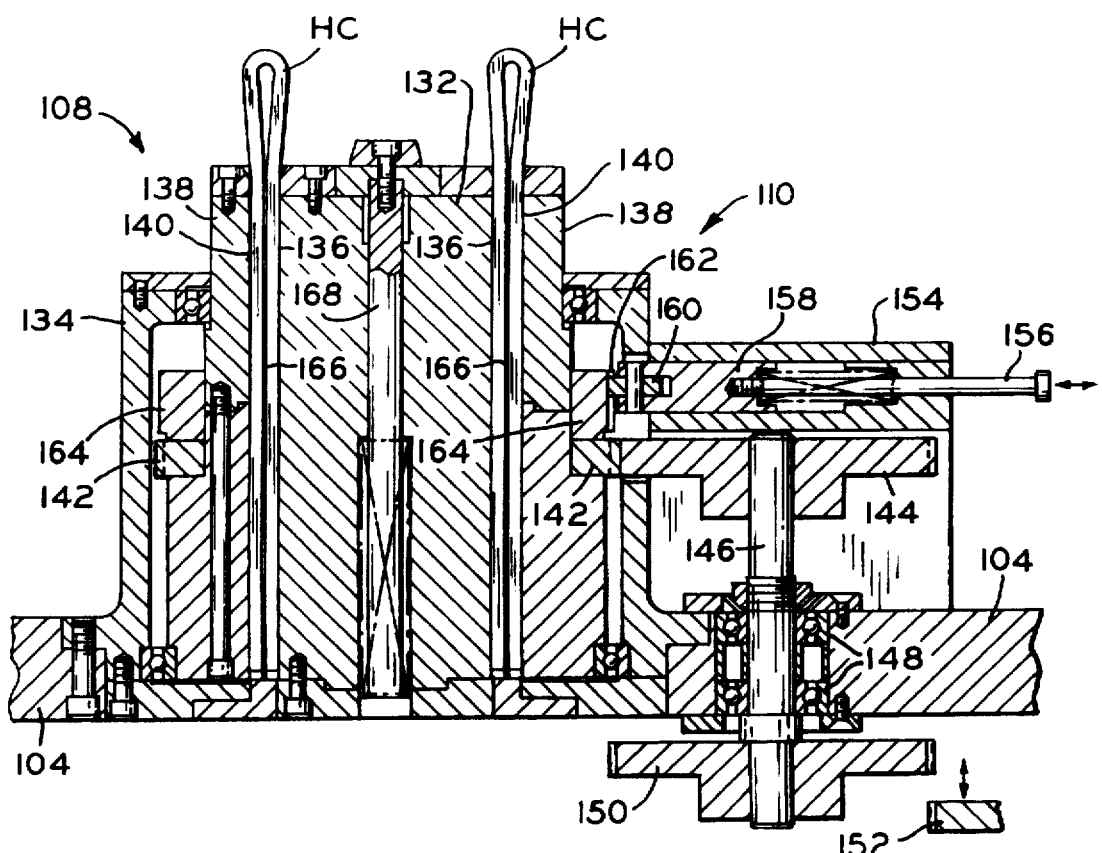
FIG_7

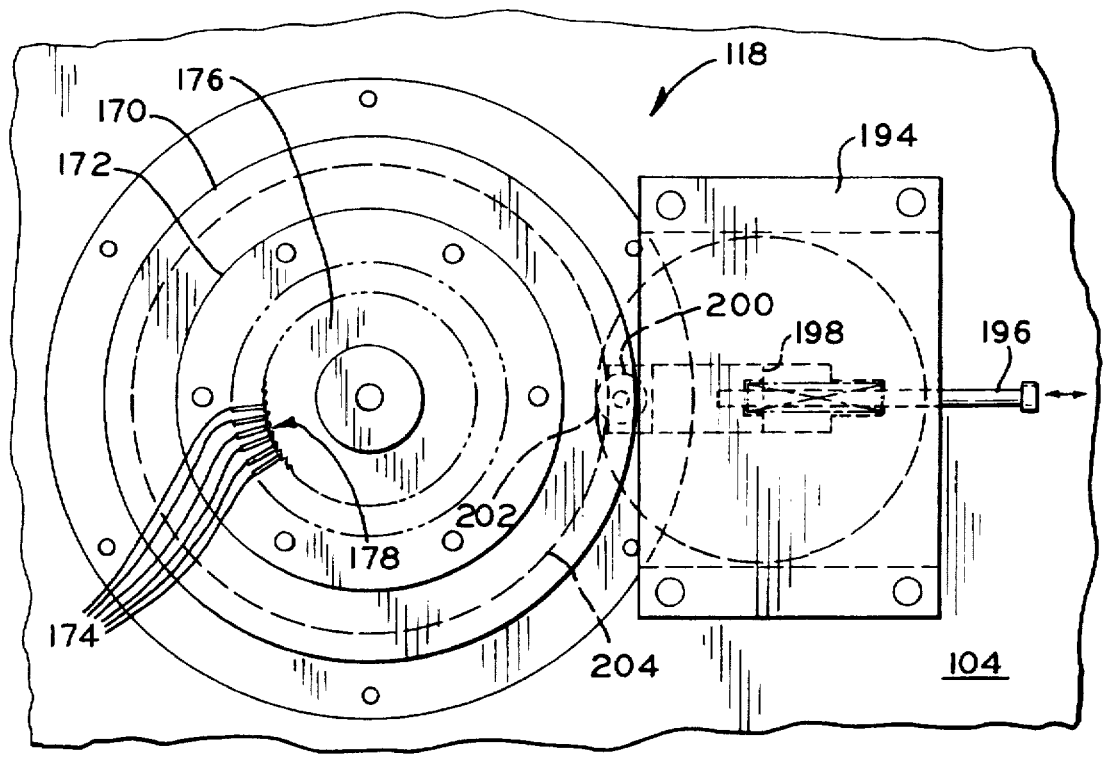
FIG_8
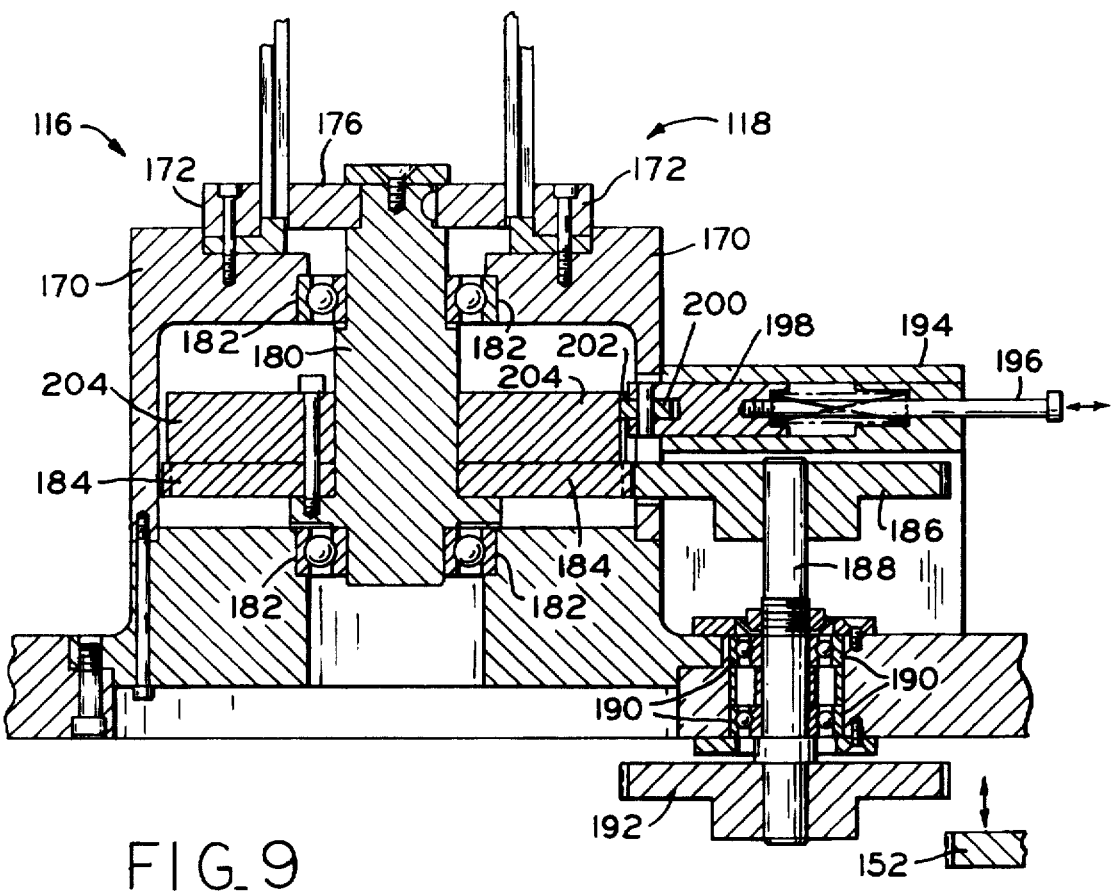
FIG_9

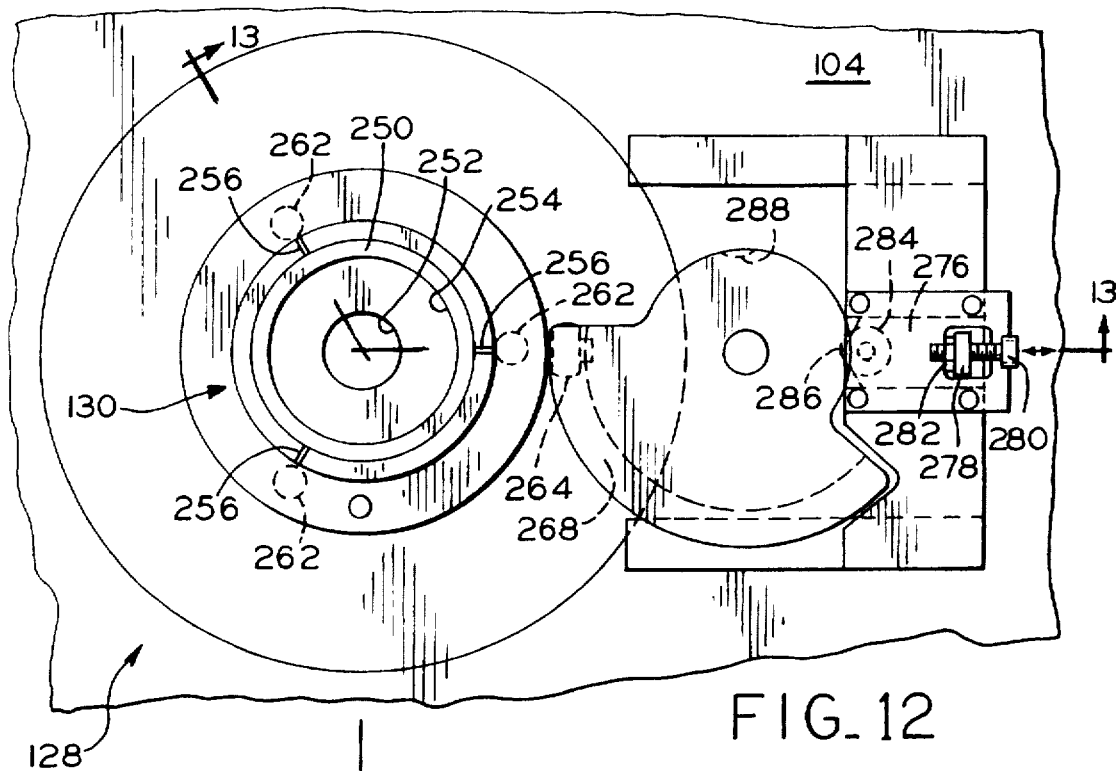
FIG_12
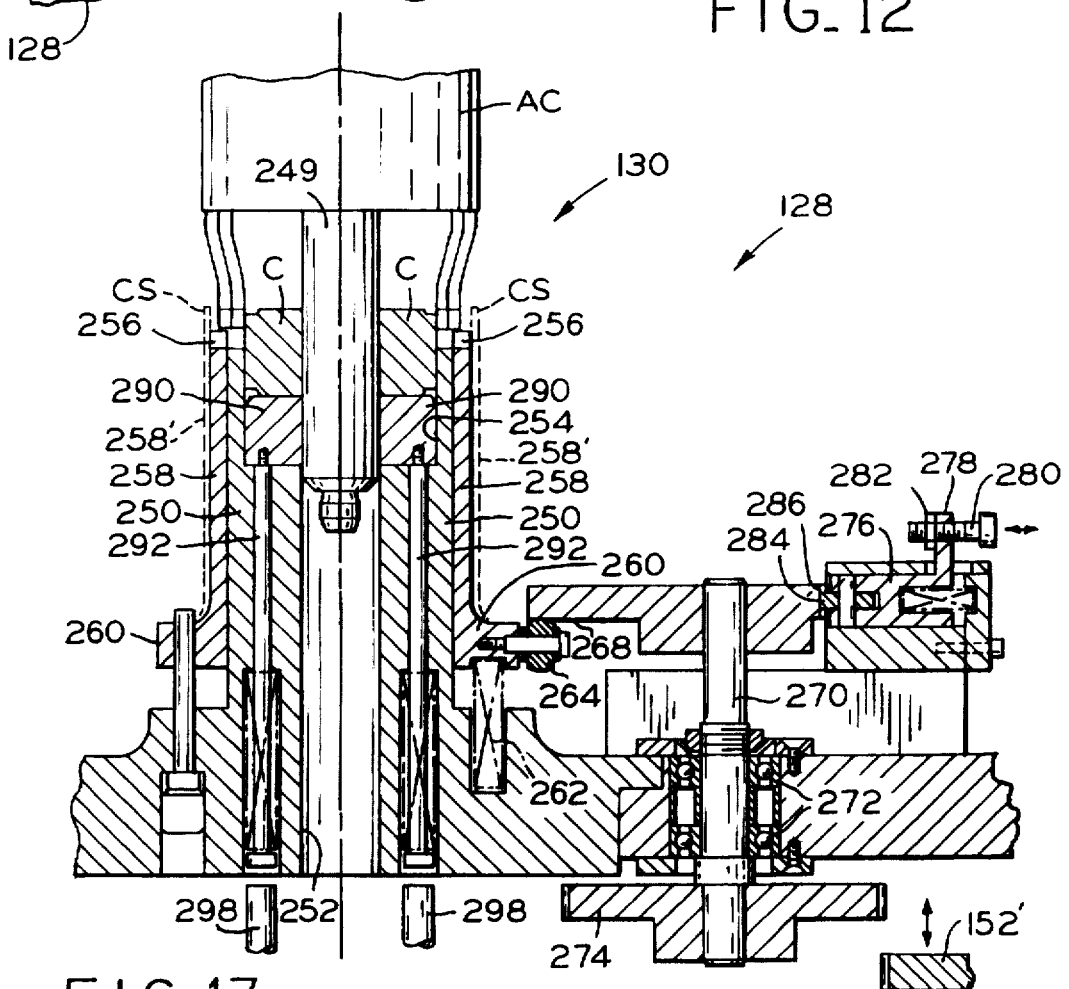
FIG_13

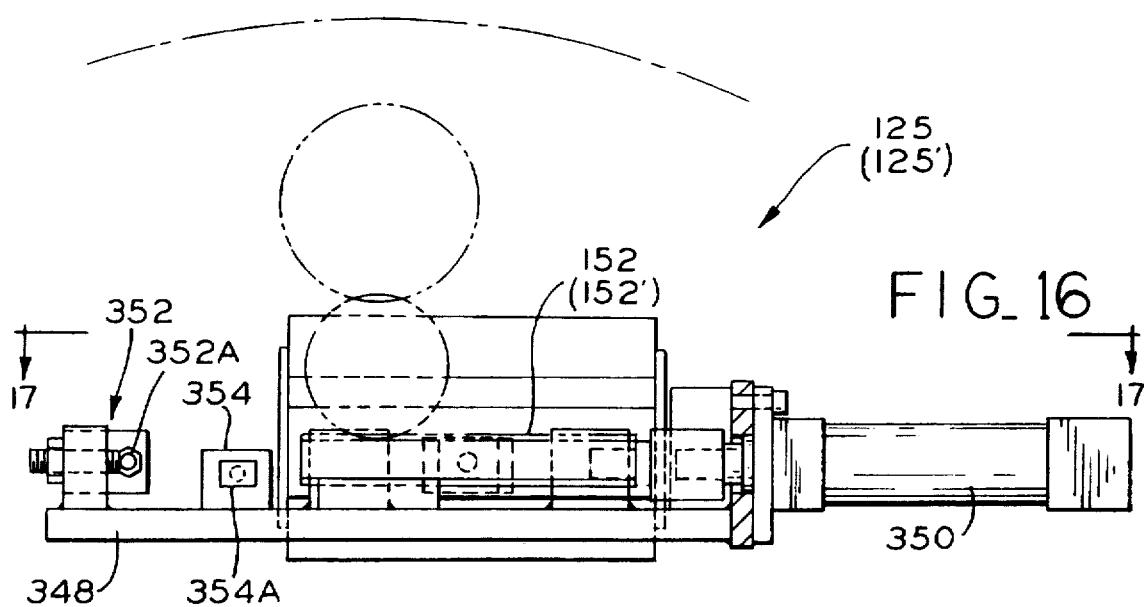
FIG_16
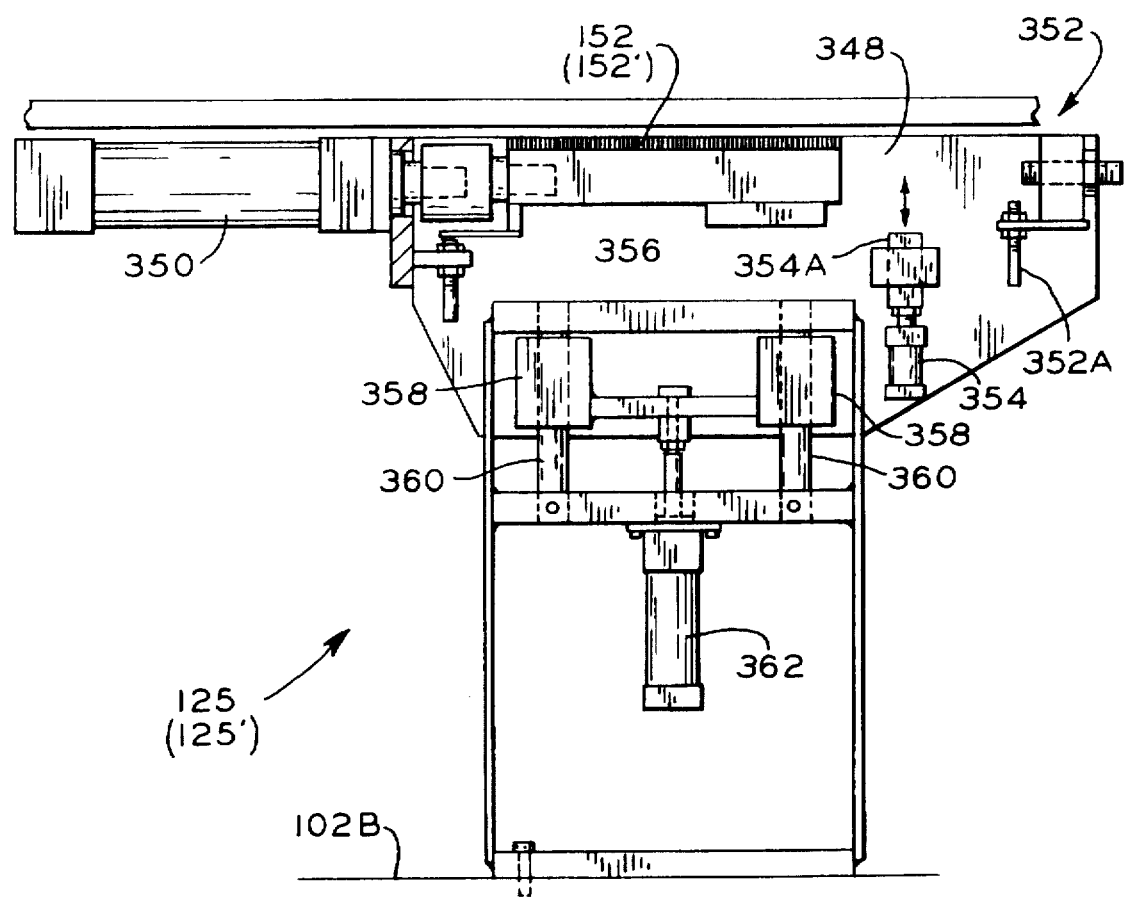
FIG_17

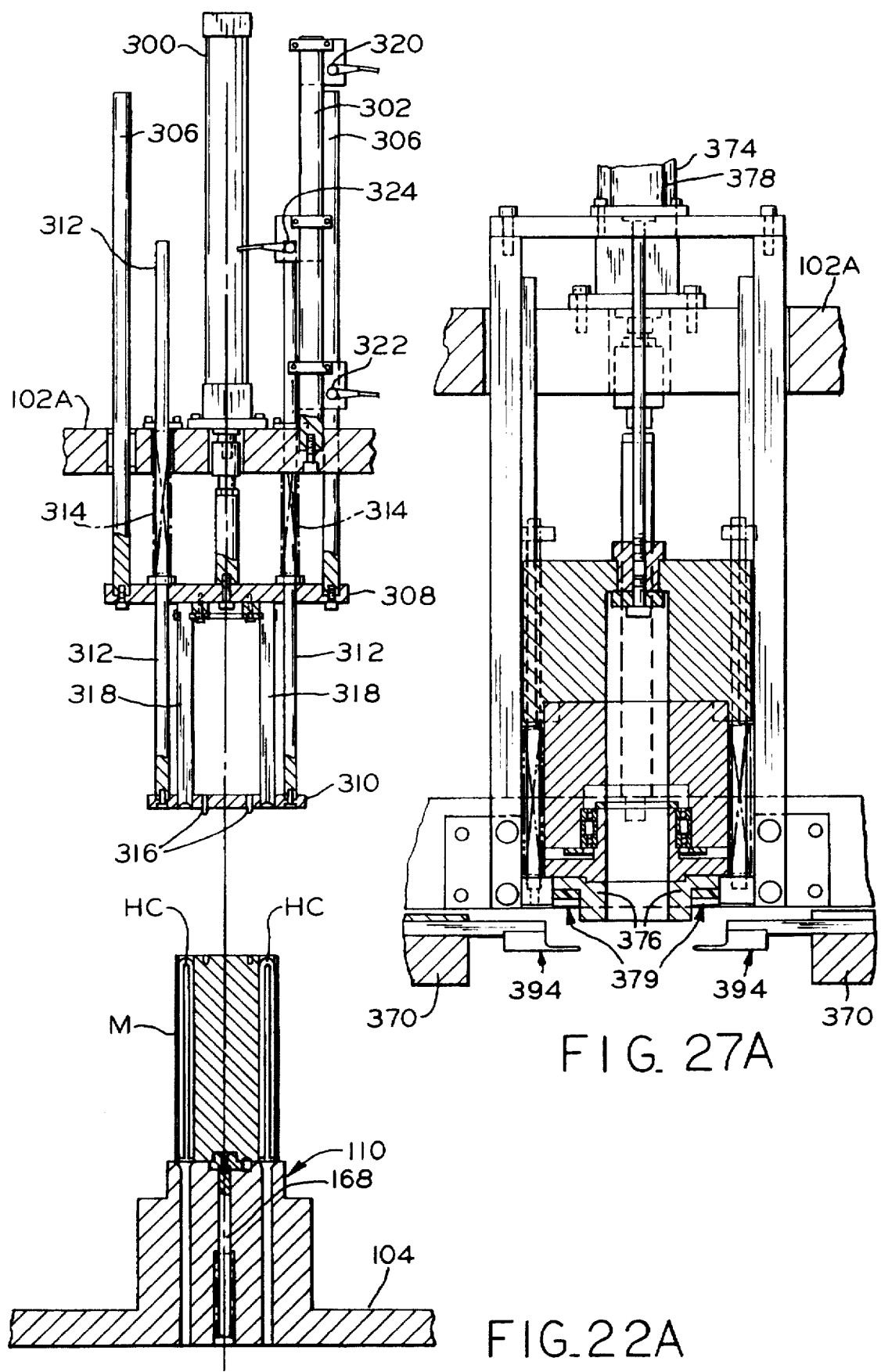

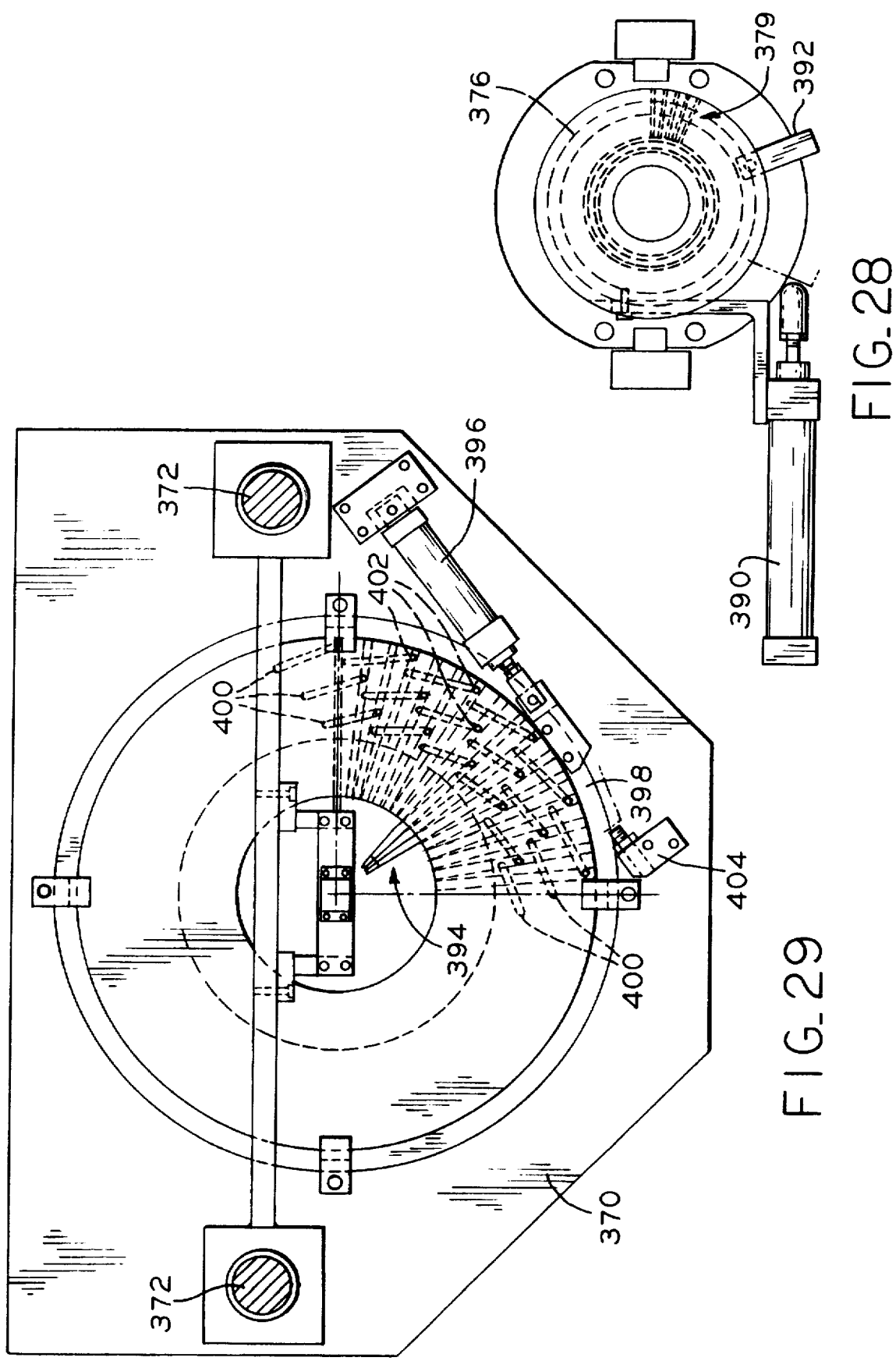

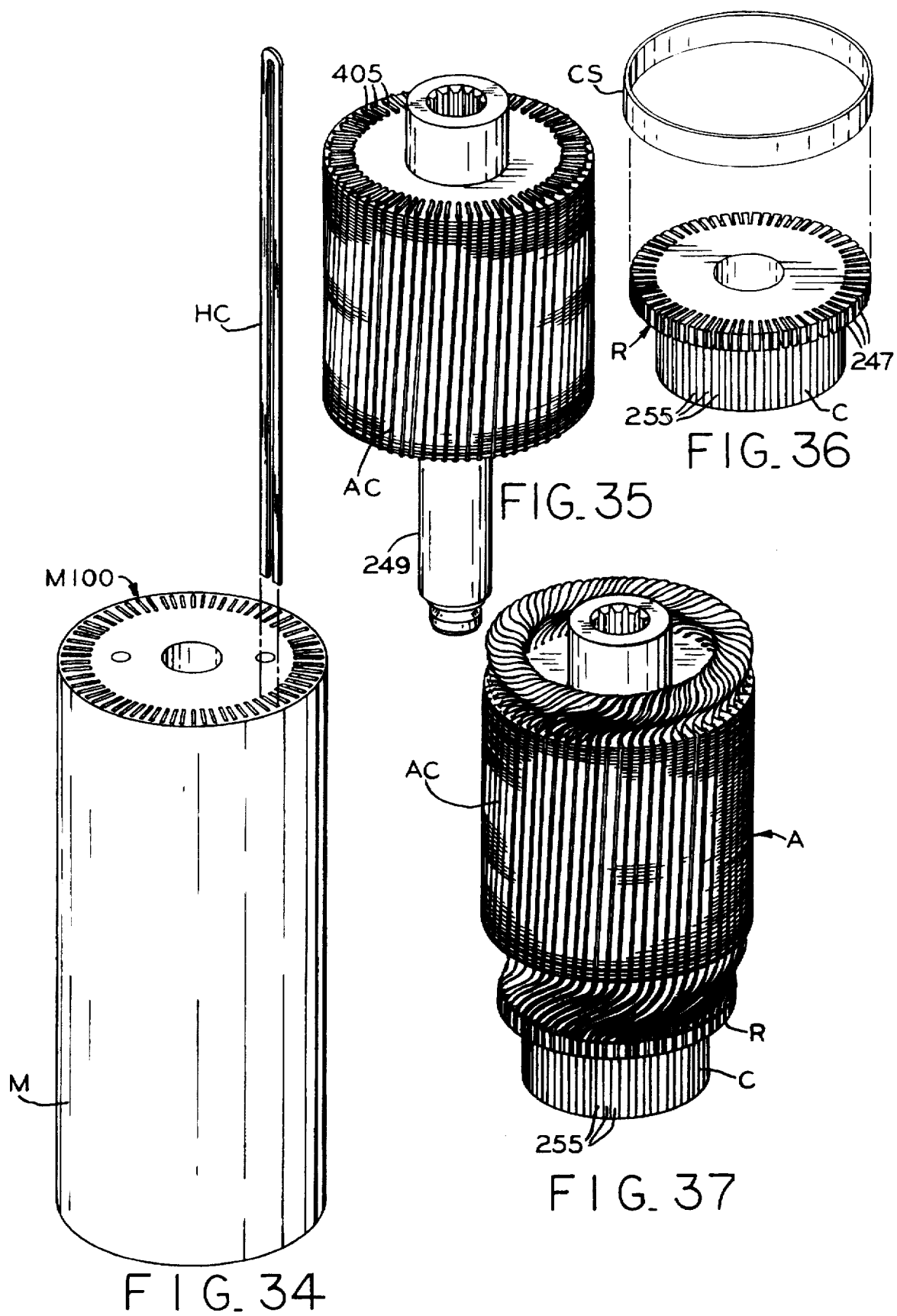

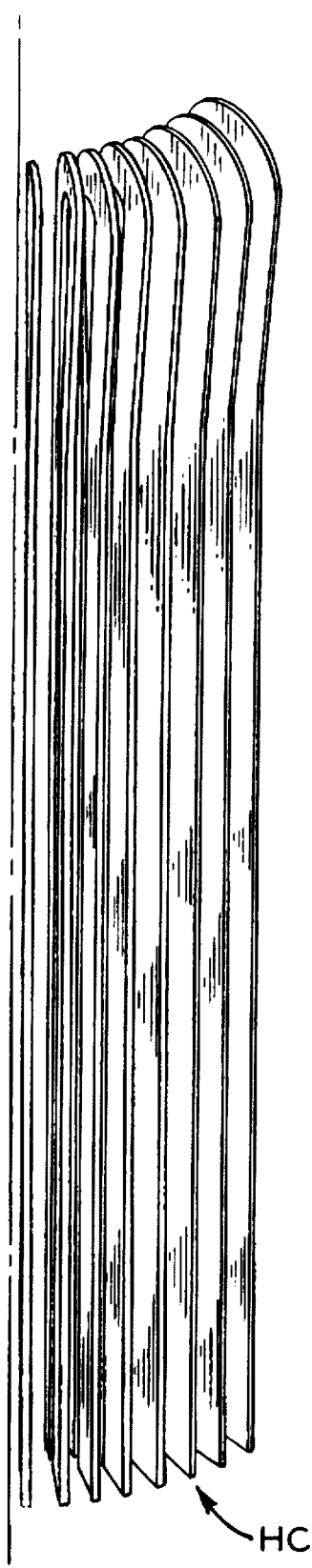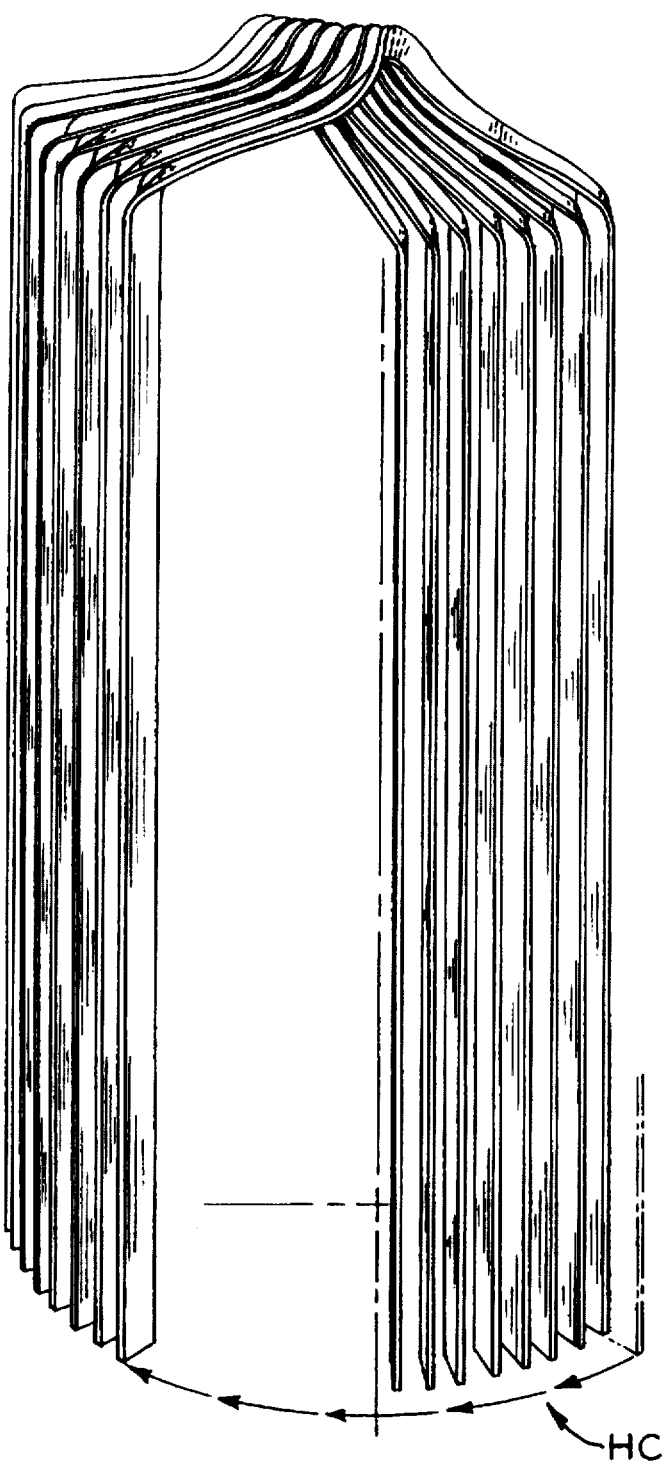
FIG_43    FIG_44

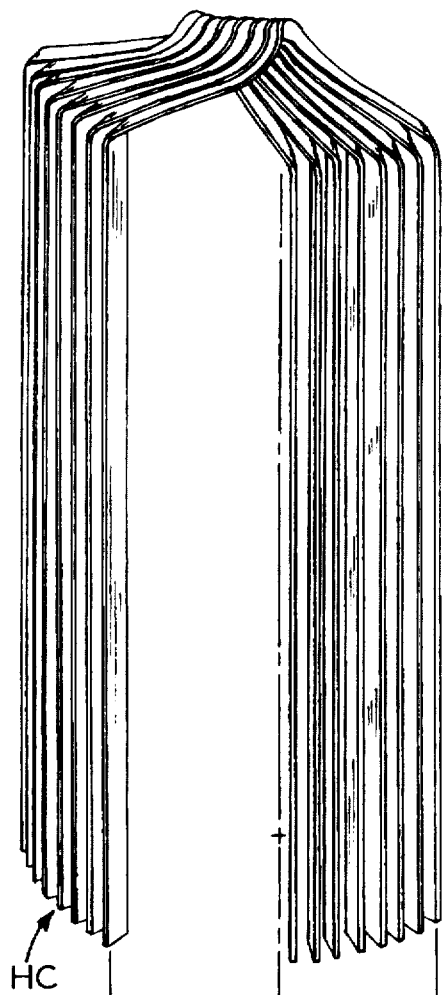
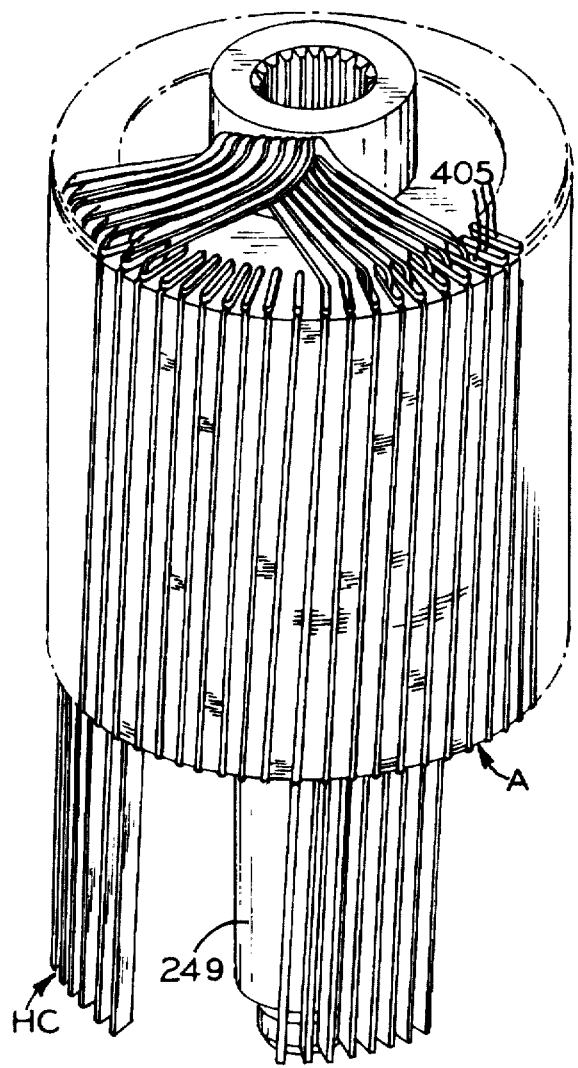
FIG. 46
FIG. 45

METHOD FOR MAKING ARMATURES FOR ELECTRODYNAMIC MACHINES

This is a division of applicatioon Ser. No. 07/830,103 filed Feb. 3, 1992 now U.S. Pat. No. 5,363,546.

BACKGROUND OF THE INVENTION

The present invention relates generally to electrodynamic machines and, more particularly, to methods and apparatus for making armatures for such machines by forming and inserting a plurality of single-turn hairpin conductors into peripheral slots of an armature core and securing the free distal ends of the hairpin conductors in a commutator which is pressed onto the armature core.

In the manufacture of armatures for electric motors used for example in golf carts, lift trucks and similar applications, a stack of armature laminations are pressed onto an armature shaft to form an armature core. The laminations have circumferentially spaced openings adjacent or extending to their edges which openings are substantially aligned as the laminations are stacked to define a plurality of radially extending slots around the periphery of the core. Rectangular wire is formed into single-turn coils taking the form of loops, commonly called hairpins, for insertion into the armature core slots. Prior to insertion, the hairpin conductors are shaped such that the legs of the hairpin conductors are spread and oriented to be inserted into different slots of the armature core. After shaping, the hairpin conductors are often referred to as frog legs.

To facilitate assembly of armatures, particularly hand assembly, the slots are open, i.e. extend to the edges of the laminations, and are made sufficiently wide that the hairpin conductors can be moved into the open slots from the cylindrical side face of the core. However, for such wide open slots, insulating wedges are also fitted into the slots or other arrangements are made to retain the hairpins within the slots during rotation of the armature. One hairpin retaining arrangement is to make the slots closed or with only a narrow opening at the edges of the laminations. If the slots are closed or have openings which are not as wide as a hairpin conductor, the hairpin conductors must be inserted into the armature core from the ends of the core.

The free ends of the hairpin conductors emerging from the opposite end of the armature core are also spread and oriented to be received within risers or other conductor receiving structure of a commutator. Finally, a commutator is pressed onto the armature shaft engaging the free ends of the hairpin conductors which are ultimately brazed, welded or otherwise secured to the commutator.

In an effort to automate the manufacture of electric motors, a number of systems have been developed to perform one or more of the noted operations required to produce an armature. For example, U.S. Pat. No. 1,555,931 discloses assembly of an armature wherein an armature core is initially formed and hairpin conductors are preformed into frog legs. The frog leg conductors are manually inserted into an armature core and then simultaneously driven through the armature core by a press.

U.S. Pat. No. 1,544,623, which was reissued as Re. 16,823, discloses a machine for receiving an armature core having frog leg conductors already inserted therein, holding slot insulators in place while forcing the conductors through the core, and bending the ends of the conductors which extend beyond the core to predetermined positions.

U.S. Pat. No. 1,661,344 discloses armature assembling apparatus wherein frog leg conductors are initially partially inserted into slots of an armature core which is then loaded into the assembling apparatus. A cylinder is operated to force all conductors through the core in one operation.

U.S. Pat. No. 1,556,893 discloses apparatus for making armatures wherein a commutator is press fitted onto an otherwise completed armature core. Cam operated slides force free ends of hairpin conductors extending through the armature core inwardly to be received within a commutator.

U.S. Pat. No. 1,556,892 discloses apparatus for making armatures wherein cam driven slides clamp deformable riser tangs on a commutator to simultaneously connect all commutator bars to armature conductors.

U.S. Pat. No. 1,556,891 discloses apparatus for simultaneously twisting the ends of hairpin conductors already inserted into an armature core to align them with commutator bars. Cam inserted forming members ensure that the bending does not materially weaken hairpin insulation.

U.S. Pat. No. 1,690,336 discloses apparatus for bending the ends of hairpin conductors already inserted into an armature core.

U.S. Pat. No. 1,703,188 discloses a machine for receiving an armature core with hairpins inserted therein and for bending the ends of the hairpins toward a central armature shaft prior to bending the hairpins for alignment with commutator bars.

U.S. Pat. No. 4,437,230 discloses preliminarily bending ends of hairpin windings in an armature core such that a layer of insulation is not required between terminal portions which extend between the armature core and a commutator.

U.S. Pat. No. 4,207,669 discloses a partially automated system which begins with coiled wire and produces an armature core ready to receive a commutator. Wire is formed into hairpin loops which are individually inserted into a retaining mechanism. Once fully loaded, the mechanism is transported to a working zone where the mechanism is operated to form a set of coils. The mechanism containing the coils is conveyed to a table where it is manually oriented and the table is moved toward a head which removes the coils from the mechanism. The empty mechanism is returned for reuse. The head next inserts the coils into slots an armature core which is manually installed into a receiver as the coils are being removed from the mechanism. The armature cores are then manually installed in a storing station. The armature cores are fed into a mechanism for pressing the coils into the armature core. The ends of the coils are then moved apart from one another by operation of the mechanism.

In spite of these substantial efforts, armatures for electric motors are still commonly hand assembled resulting in high expense and product inconsistencies which are characteristic of hand assembly. Thus, a need remains for methods and apparatus for automating the manufacture of armatures for electrodynamic machines by mechanically combining a plurality of single-turn hairpin conductors with an armature core and a commutator to form inexpensively and consistently such armatures without manual assembly.

SUMMARY OF THE INVENTION

This prior art need is met by the methods and apparatus of the present invention wherein an operator sequentially inserts into an automated system loaded magazines containing a required number of hairpin conductors for an armature to be made, an armature core comprising a plurality of substantially aligned laminations preassembled to form the core and a commutator, and removes armatures completed by assembling the noted components. All the insertion and removal steps are performed from an operator's position such that operation of the system embodying the present invention is easily and conveniently performed even though the components and completed armatures can be of substantial weight.

A hairpin magazine, including the hairpin conductors required for an armature, permits simultaneous transfer of all the conductors into upper twist tooling wherein upper ends of the hairpin conductors adjacent end turn portions of the conductors are moved apart relative to one another. The frog leg conductors thus formed are removed from the upper twist tooling and inserted into slots of an armature core which has been earlier inserted into the system by the system operator. The frog leg conductors are fully pressed through the armature into lower twist tooling which then is operated to move the ends of the conductors extending beyond the armature core away from one another and into alignment with other conductors for insertion into a commutator for the armature, which commutator was earlier placed into the system by the operator. The commutator is properly positioned beneath the armature core which is then pressed onto the commutator. The completed armature is moved to the operator's position where the operator removes the completed armature and replaces it by with a commutator for the next armature. The operator continues to insert components of armatures into the system and removes completed armatures made up by assembling the parts so inserted.

In accordance with one aspect of the present invention, a method of making an armature for an electrodynamic machine comprises the steps of: simultaneously moving a defined plurality of hairpin conductors into upper twist tooling; operating the upper twist tooling to rotate legs of the hairpin conductors adjacent end turns of the hairpin conductors to displace the legs in opposite directions relative to one another by a defined angular displacement corresponding to the upper twist; removing the plurality of hairpin conductors from the upper twist tooling; inserting the hairpin conductors into an armature core defining a plurality of conductor receiving slots corresponding to the defined plurality around the periphery thereof; driving the hairpin conductors through the armature core to extend into lower twist tooling positioned adjacent the armature core; operating the lower twist tooling to rotate the distal ends of the legs of the hairpin conductors to displace the legs in opposite directions relative to one another by a defined angular displacement corresponding to the lower twist; and, pressing a commutator onto the armature core to receive the distal ends of the legs of the hairpin conductors.

Preferably, the step of simultaneously moving a defined plurality of hairpin conductors into upper twist tooling comprises the steps of: preforming the defined plurality of hairpin conductors; loading the defined plurality of hairpin conductors into a magazine having a corresponding defined plurality of conductor receiving ports formed into the periphery thereof; positioning the magazine adjacent the upper twist tooling; and, inserting a defined plurality of stripper blades into the conductor receiving ports of the magazine to move the defined plurality of hairpin conductors into the upper twist tooling.

In accordance with another aspect of the present invention, a method of making an armature for an electrodynamic machine comprising the steps of: preforming an armature core defining a plurality of conductor receiving slots around the periphery thereof; preforming a plurality of hairpin conductors each having two legs interconnected by an end turn; preforming a commutator adapted to be received by the core; preforming a magazine having a plurality of conductor receiving ports formed into the periphery thereof; loading the plurality of hairpin conductors into the magazine; placing a loaded magazine onto a first position of a turntable at a first operator's station of the system, the first position of the turntable including upper twist tooling; rotating the turntable one position such that the loaded magazine at the first position of the turntable is moved to a second station of the system and a second position of the turntable is moved to the first station of the system; simultaneously loading the plurality of hairpin conductors into the upper twist tooling from the magazine;rotating the turntable one position such that the loaded upper twist tooling at the first position of the turntable is moved to a third station of the system, the second position of the turntable is moved to the second station of the system, and a third position of the turntable is moved to the first station of the system, the third position of the turntable including lower twist tooling; placing the armature core onto the third position of the turntable; operating the upper twist tooling to rotate the legs of the hairpin conductors adjacent the end turns thereof to displace the legs in opposite directions relative to one another by a defined angular displacement corresponding to the upper twist; removing the plurality of hairpin conductors from the upper twist tooling; rotating the turntable one position such that the first position of the turntable is moved to a fourth station of the system, the second position of the turntable is moved to the third station of the system, the third position of the turntable is moved to the second station of the system, and a fourth position of the turntable is moved to the first station of the system, the plurality of hairpin conductors being retained at the third station of the system; placing the commutator onto the fourth position of the turntable; rotating the turntable one position such that the first position of the turntable is moved to the first station of the system, the second position of the turntable is moved to the fourth station of the system, the third position of the turntable is moved to the third station of the system, and the fourth position of the turntable is moved to the second station of the system, the armature core at the third position of the turntable being positioned adjacent the plurality of hairpin conductors at the third station of the system; inserting the plurality of hairpin conductors into the armature core; driving the hairpin conductors through the armature core to partially extend into the lower twist tooling positioned adjacent the armature core; rotating the turntable one position such that the first position of the turntable is moved to the second station of the system, the second position of the turntable is moved to the first station of the system, the third position of the turntable is moved to the fourth station of the system, and the fourth position of the turntable is moved to the second station of the system, the hairpin conductors being extended fully through the armature and into the lower twist tooling at the fourth station of the system; operating the lower twist tooling to rotate the distal ends of the legs of the hairpin conductors to displace the legs in opposite directions relative to one another by a defined angular displacement corresponding to the lower twist; rotating the turntable one position such that the first position of the turntable is moved to the third station of the system, the second position of the turntable is moved to the second station of the system, the third position of the turntable is moved to the first station of the system, and the fourth position of the turntable is moved to the fourth station of the system, the commutator being positioned adjacent the armature at the fourth station of the system; pressing the commutator onto the armature core to receive the distal ends of the legs of the plurality of hairpin conductors and thereby complete the armature; rotating the turntable one position such that the first position of the turntable is moved to the fourth station of the system, the second position of the turntable is moved to the third station of the system, the third position of the turntable is moved to the second station of the system, and the fourth position of the turntable is moved to the first station of the system; and, removing the completed armature from the system at the first operator's station.

In preferred embodiments of the present invention, the methods further comprise the step of inserting distal ends of the hairpin conductors into alignment means, positioned for example at the second position of the turntable, prior to inserting the hairpin conductors into an armature core. The alignment means forces the distal ends of the conductors together and into proper alignment to facilitate and ensure proper insertion of the conductors into the armature core.

To facilitate insertion of the hairpin conductors into the upper twist tooling and reuse of the magazine the methods may further comprise the steps of: engaging the magazine; and, moving the magazine to a return position after the hairpin conductors have been removed therefrom. To facilitate removal of the magazine, the method may further comprise the step of moving the magazine away from the upper twist tooling to totally remove the hairpin conductors therefrom prior to moving the magazine to the return position. In the preferred methods, the step of removing the plurality of hairpin conductors from the upper twist tooling comprises the steps of: inserting a plurality of stripper blades into the upper twist tooling to move the plurality of hairpin conductors out of the upper twist tooling; and, clamping the hairpin conductors in conductor engaging fingers, the hairpin conductors being supported by the conductor engaging fingers.

The step of inserting hairpin conductors into an armature core may comprises the steps of: engaging the end turns of the hairpin conductors, and applying an inserting force thereto. Alternately and where the inserting force is substantial, the step of inserting hairpin conductors into an armature core comprises the steps or: engaging the end turns of the hairpin conductors; applying an inserting force thereto to partially insert the hairpin conductors into the armature core; clamping the hairpin conductors by clamping fingers at a position spaced from the end turns; and, applying an inserting force to the hairpin conductors via the clamping fingers.

To overcome memory within the hairpin conductors which tends to cause the conductors to return toward their original position after twisting, the step of operating the upper twist tooling may comprise the steps of: operating the upper twist tooling in a first direction to rotate the legs of the hairpin conductors adjacent end turns thereof to displace the legs in opposite directions relative to one another by an angular displacement exceeding the defined angular displacement corresponding to the upper twist; and, operating the upper twist tooling in a second direction opposite to the first direction to return the legs of the hairpin conductors adjacent end turns thereof to the defined angular displacement corresponding to the upper twist and thereby stably displace the legs adjacent the end turns by the defined angular displacement corresponding to the upper twist. To facilitate alignment of the hairpin conductors with slots of an armature core, it is advantageous to define the twisting operation in terms of slots of the armature core. For such operation, the step of operating the upper twist tooling in the first direction is performed to displace the legs by a circumferential distance corresponding to x+ slots of the armature core, and the step of operating the upper twist tooling in the second direction is performed to displace the legs by a circumferential distance corresponding to slot of the armature core, x being equal to the defined angular displacement corresponding to the upper twist in terms of slots of the armature core.

In the preferred embodiment of the methods of the present invention, the step of operating the lower twist tooling comprises the steps of: monitoring the circumferential positioning of the armature core; operating the lower twist tooling to displace the legs of the hairpin conductors adjacent distal ends thereof in opposite directions relative to one another, the armature core being circumferentially displaced by operating the lower twist tooling, and the legs being rotated until the armature core is angularly displaced by a defined circumferential distance; clamping the armature core; and, operating the lower twist tooling until the legs of the hairpin conductors adjacent distal ends thereof are displaced relative to one another by the defined angular displacement corresponding to the lower twist.

In accordance with yet another aspect of the present invention, a system for manufacturing an armature for an electrodynamic machine comprises a plurality of processing positions and a plurality of processing stations, a first one of the processing stations being an operator's station where components of an armature are placed into the system for assembly. The components placed into the system by the operator comprise a magazine holding a plurality of hairpin conductors, an armature core and a commutator. To assemble the components into an armature, conveyor means support the plurality of processing positions and sequentially move them to the plurality of processing stations. The plurality of processing positions includes a first position defining upper twist tooling, the first position receives the magazine when positioned in the operator's station.

The plurality of processing stations also includes a second station. The second station comprises hairpin insert presser means for transferring the plurality of hairpin conductors from the magazine into the upper twist tooling while the first position is positioned at the second station, and magazine ejection means for forcing the magazine away from the upper twist tooling. The second station further comprises magazine gripping means for engaging the magazine to thereby stabilize the magazine during transfer of the plurality of hairpin conductors from the magazine to the upper twist tooling. To facilitate reuse of the magazines, the system further comprises magazine return means for conveying empty magazines from the second station for reuse. Preferably, the magazine gripping means is movable and further provides for moving the empty magazine from the second station to the magazine return means.

The plurality of processing stations includes a third station. The third station comprises upper twist drive means for operating the upper twist tooling, hairpin removal presser means for removing hairpins from the upper twist tooling, and hairpin support means for gripping and supporting the hairpins at the third station independently of the upper twist tooling.

To facilitate insertion of the conductors into an armature core, the plurality of processing positions includes a second position defining alignment means for receiving and aligning distal ends of the hairpin conductors.

The plurality of processing positions includes a third position defining lower twist tooling, the third position receiving the armature core when positioned in the operator's station. The hairpin support means further provides for inserting the hairpins into the armature core when the third position is positioned at the third station. The third station further comprises hairpin driver means for driving the hairpins into and through the armature into the lower twist tooling. The hairpin support means may further provide for driving the hairpins into and through the armature into the lower twist tooling.

The plurality of processing stations includes a fourth station comprising first press means for engaging end turns of the plurality of hairpin conductors and second press means for moving the lower twist tooling and the armature toward the first press means to thereby fully insert distal ends of the plurality of hairpin conductors into the lower twist tooling. Lower twist drive means are provided at the fourth station for operating the lower twist tooling. The fourth station further comprises sensor means for monitoring the position of the armature core as the lower twist tooling is operated, and clamping means for clamping the armature core when the armature core reaches a desired position. The fourth station further comprises hairpin gripper means for gripping the hairpin conductors to assist in supporting the hairpin conductors and armature core independent of the lower twist tooling.

The plurality of processing positions includes a fourth position for receiving the commutator when the fourth position is positioned in the operator's station. The first press means further provides for pressing the commutator onto the armature core. Preferably, the conveyor means comprises a turntable with the processing positions spaced thereon and moving the processing positions through the plurality of processing stations as the turntable is rotated, armatures assembled by the system being removed at the operator's station.

In accordance with still another aspect of the present invention, a system for manufacturing an armature for an electrodynamic machine comprises a turntable defining first, second, third and fourth processing positions spaced therearound. Stationary processing means surround the turntable and define first, second, third and fourth processing stations spaced around the turntable. The spacing of the processing stations corresponds to the spacing of the processing positions such that the processing positions are aligned with the processing stations as the turntable is rotated. The first processing station is an operator's station where components of an armature are placed into the system for assembly. The components use to assemble an armature comprise a magazine holding a plurality of hairpin conductors, an armature core and a commutator.

The first position of the turntable includes upper twist tooling and receives magazines when positioned in the operator's station. The second station comprises hairpin insert presser means for transferring the plurality of hairpin conductors from the magazine into the upper twist tooling while the first position is positioned at the second station, and magazine ejection means for forcing the magazine away from the upper twist tooling. Preferably, the second station further comprises magazine gripping means for engaging the magazine to thereby stabilize the magazine during transfer of the plurality of hairpin conductors from the magazine to the upper twist tooling.

To facilitate reuse of the magazines, the system further comprises magazine return means for conveying empty magazines from the second station. In the preferred embodiment, the magazine gripping means is movable and further provides for moving the empty magazine from the second station to the magazine return means.

The third station comprises upper twist drive means for operating the upper twist tooling, hairpin removal presser means for removing hairpins from the upper twist tooling, and hairpin support means for gripping and supporting the hairpins at the third station independently of the upper twist tooling. To facilitate insertion of the conductors into the armature core, the second position preferably defines alignment means for receiving and aligning distal ends of the hairpin conductors prior to insertion into the armature core.

The third position defines lower twist tooling and receives armature cores when positioned in the operator's station. The hairpin support means at the third station further provides for inserting the hairpins into the armature core when the third position is positioned at the third station. The third station further comprises hairpin driver means for driving the hairpins into and through the armature into the lower twist tooling. The hairpin support means may further provide for driving the hairpins into and through the armature into the lower twist tooling.

The fourth station comprises first press means for engaging end turns of the plurality of hairpin conductors, second press means for moving the lower twist tooling and the armature toward the first press means to thereby fully insert distal ends of the plurality of hairpin conductors into the lower twist tooling, and lower twist drive means for operating the lower twist tooling. The fourth station further comprises sensor means for monitoring the position of the armature core as the lower twist tooling is operated, and clamping means for clamping the armature core when the armature core reaches a desired position. The fourth station further comprises hairpin gripper means for gripping the hairpin conductors to assist in supporting the hairpin conductors and armature core independent of the lower twist tooling. The fourth position receives commutators when it is positioned in the operator's station. The first press means of the fourth station further provides for pressing the commutator onto the armature core.

It is thus an object of the present invention to provide improved methods and apparatus for assembly of armatures of electrodynamic machines; to provide improved methods and apparatus for assembly of armatures of electrodynamic machines whereby an operator can insert components of an armature for such machines at an operator's position and remove completed armatures at the same position; to provide improved methods and apparatus for assembly of armatures of electrodynamic machines whereby an operator can sequentially insert magazines loaded with hairpin conductors, armature cores and commutators for armatures of such machines at an operator's position and remove completed armatures at the same position; to provide improved methods and apparatus for assembly of armatures of electrodynamic machines wherein a plurality of hairpin conductors are simultaneously inserted into upper twist tooling for forming a corresponding plurality of frog leg conductors by operation of the upper twist tooling; and, to provide improved methods for assembly of armatures of electrodynamic machines which methods can be performed by apparatus which comprises a turntable defining first, second, third and fourth processing positions spaced therearound and stationary processing means surrounding the turntable and defining first, second, third and fourth processing stations spaced around the turntable for alignment with the processing positions as the turntable is rotated.

Other objects and advantages of the invention will be apparent from the following description, the accompanying drawings and the appended claims.

BRIEF DESCRIPTION OF THE DRAWINGS

FIG. 3 is a plan view of the machine of FIG. 1 taken at a higher elevation on the machine to schematically illustrate equipment of the processing stations located above the turntable of the machine;

FIG. 4 and 5 are side elevational and plan views, respectively, of a magazine gripping arm associated with the operation of a second station of the machine of FIG. 1;

FIG. 6 is a plan view of a first processing position of the turntable of the machine of FIG. 1;

FIG. 7 is a sectioned side view of the first position of the turntable of the machine of FIG. 1;

FIG. 8 is a plan view of a second processing position of the turntable of the machine of FIG. 1;

FIG. 9 is a sectioned side view of the second position of the turntable of the machine of FIG. 1;

FIG. 12 is a plan view of a fourth position of the turntable of the machine of FIG. 1;

FIG. 13 is a sectioned side view of the fourth position of the turntable of the machine of FIG. 1;

FIG. 16 is a plan view of the drive rack of FIGS. 14 and 15;

FIG. 17 is an elevational view of the drive rack of FIG. 16 taken along the view line 17—17;

FIG. 22A is a partially sectioned elevational view of the upper portion of the second system station of the machine of FIG. 1 comparable to FIG. 22 however in its preoperation, fully raised position, see drawing sheet 17;

FIG. 27A is a partially sectioned elevational view of part of the upper portion of the third station of the machine of FIG. 1 on a further enlarged scale with the end turn retainer ring shown in its lowered position, see drawing sheet 17;

FIG. 28 shows a plan view of apparatus for initially aligning a hairpin end turn engaging plate of the third station of the machine of FIG. 1;

FIG. 29 is a plan view of a platen of the third station of the machine of FIG. 1;

FIG. 34 is a perspective view of a magazine for receiving the hairpin conductors used in the present invention to manufacture an armature;

FIG. 35 is a perspective view of an armature core used in the present invention to manufacture an armature;

FIG. 36 is a perspective view of a commutator used in the present invention to manufacture an armature; and FIG. 37 is a perspective view of an armature manufactured in accordance with the present invention.

FIGS. 37–48 show different shapes and configurations of the conductors at various stages of their transformations.

DETAILED DESCRIPTION OF THE INVENTION

Figure 1:
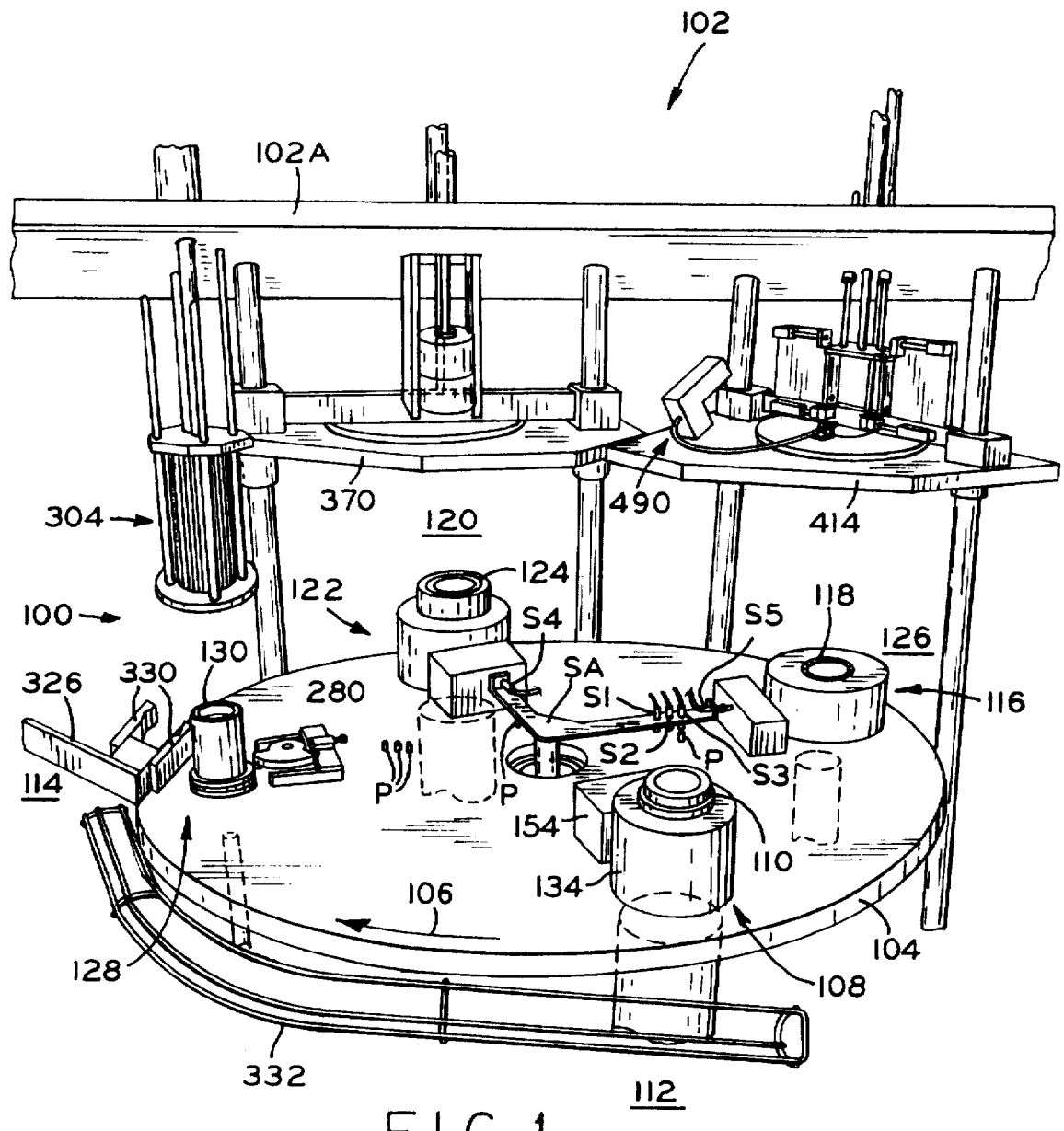
FIG. 1 is a schematic perspective view of a machine for making armatures for electrodynamic machines in accordance with the present invention.

Reference will now be made to the drawing figures which illustrate a preferred embodiment of apparatus in accordance with the present invention taking the form of a machine or system for making armatures for electrodynamic machines by performing methods in accordance with the present invention. An overview of operation of the illustrated system will initially be made with reference then being made to the processing positions of a turntable incorporated into the preferred embodiment of the illustrated system and to stationary processing stations of the system through which the turntable positions are conveyed by the turntable. The illustrated system incorporates the currently preferred apparatus for manufacture of armatures; however, as will be apparent to those skilled in the art, other forms of apparatus may be used to perform the methods of the present invention.

Overview of System Operation

Figure 2:
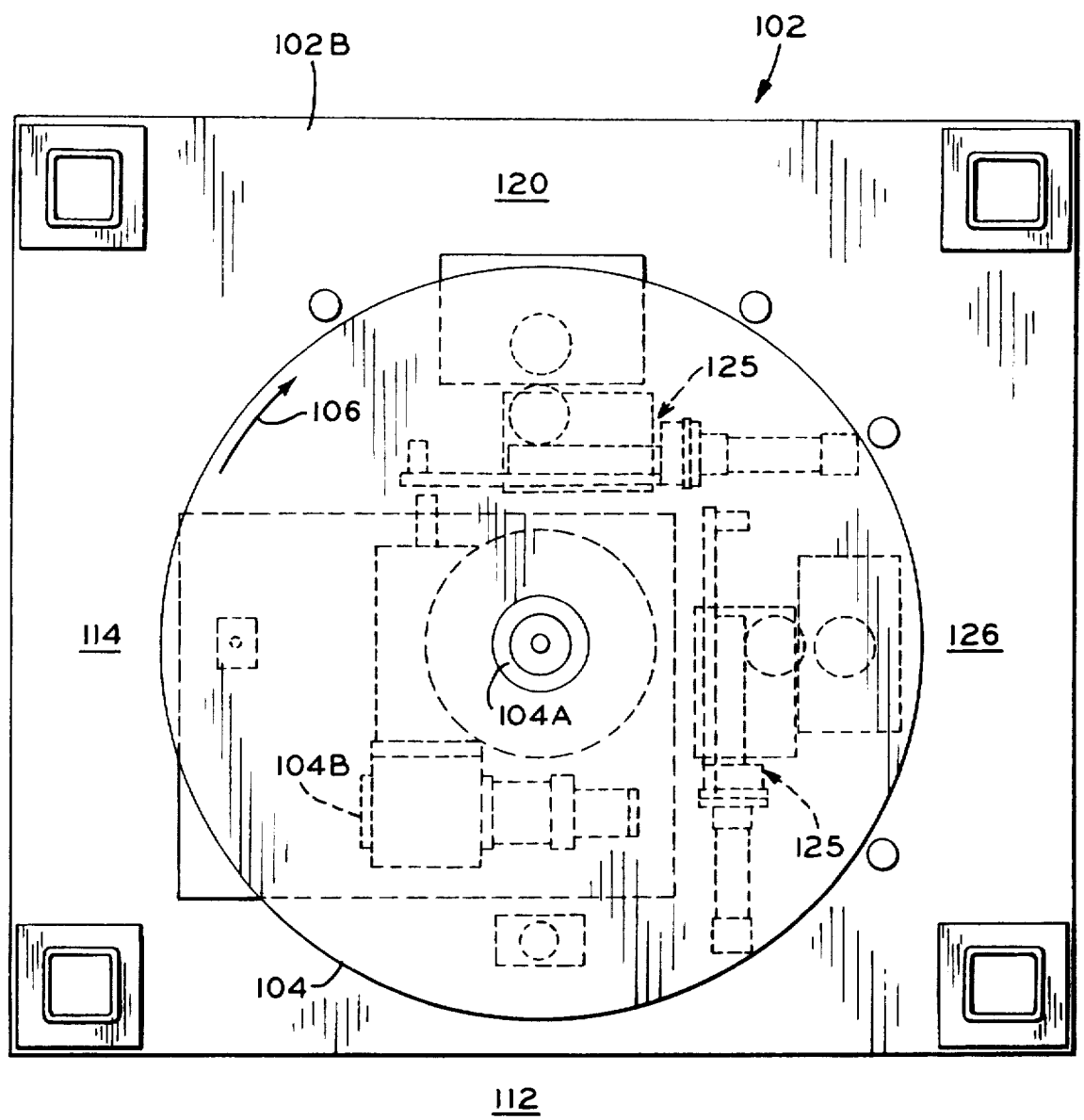
FIG. 2 is a plan view of the machine of FIG. 1 schematically illustrating processing station equipment of the machine located beneath a turntable of the machine.

Reference is initially made to drawing FIGS. 1–3 which illustrate in perspective and plan views a system 100 of the present invention for making armatures for electrodynamic motors. The system 100 operates on and assembles components into completed armatures. More particularly, an operator inserts pluralities of hairpin conductors HC's initially contained within magazines M's, armature cores AC's and commutators C's into the system which assembles the components into completed armatures A's, see FIGS. 34–37. The components are inserted or fed into the system by an operator who also removes completed armatures A's from the system, all operations being performed by one operator while the operator is positioned in a first processing station or operator's station of the system.

The system 100 includes a support frame 102 upon which is supported the remainder of the components of the system 100. A centrally located turntable 104 is supported for rotation in the clockwise direction in the illustrated embodiment as indicated by the arrows 106. The turntable 104 is supported on a column 104A which is driven or rotated by a hydraulic motor 104B and includes a plurality of processing positions circumferentially spaced around its periphery. The turntable processing positions are aligned with each of a plurality of processing stations positioned around the support frame 102 as the turntable 104 is rotated. In the illustrated embodiment, four processing positions are defined around the turntable 104 and four processing stations are defined around the support frame 102. It is noted that operations performed by various associations of the processing positions and stations could be combined or separated such that different numbers of turntable positions and system stations could be provided in accordance with the present invention and that the number of turntable positions and system stations does not have to be equal to one another.

A first processing position 108 defines upper twist tooling 110 which will be described with reference to FIGS. 6 and 7, and receives a magazine M holding a plurality of hairpin conductors HC's, see FIG. 34, when positioned in an operator's station or first station 112. The magazines M's include slots M100 which to are equal in number to the number of hairpin conductors HC's required for a given armature A and each slot is loaded with a hairpin conductor HC prior to use in the present invention. After a system operator has inserted a loaded magazine M into the system 100 on the upper twist tooling 110, the turntable 104 is rotated approximately 90°, i.e. one turntable position, clockwise such that the first position 108 of the turntable 104, including the loaded magazine M positioned on the upper twist tooling 110, is moved to a second station 114 of the system 100 and a second position 116 of the turntable 104 is moved to the first station 112 of the system 100.

The locations of the turntable positions are sensed by three proximity sensors S1, S2 and S3 located on one arm of a central sensing arm SA. The sensors S1, S2 and S3 are positioned to align with posts P inserted into the top surface of the turntable 104. Two additional proximity sensors S4 and S5 are adjustably secured in the ends of the both arms of the central sensing arm SA. The sensors S4 and S5 are used to detect operation of turntable positions when the turntable positions are located and operated in third and fourth system stations as will become apparent. As shown in FIG. 3, an optical sensor system 117 is positioned to sense whether components have been properly positioned into the turntable positions by the operator at the first system station 112. If not, operation of the system 100 is halted to prevent possible operating problems due to missing or incorrectly positioned components.

After the turntable 104 is stopped and sensed to be appropriately positioned, the plurality of hairpin conductors HC's are simultaneously loaded into the upper twist tooling 110 from the magazine M by apparatus located at the second station 114 of the system as will be described with reference to FIGS. 20–23. Empty magazines M's are returned to the operator of the system 100 for remote refilling and reuse as will be described with reference to FIGS. 1, 3, 4 and 5. The second position 116 of the turntable 104 comprises alignment means 118 for forcing the distal ends of the hairpin conductors HC's together and into proper alignment for insertion into an armature core AC as will be described with reference to FIGS. 8 and 9. While use of the alignment means 118 is preferred for the illustrative embodiment, in some applications it will be possible to operate a system in accordance with the present invention without such alignment means.

The system operator does not insert any armature components or remove any completed armatures from the system 100 while the second position 116 of the turntable 104 is positioned in the operator's station or first station 112 of the system 100. Thus, the operator can use this time to perform housekeeping operations at the first station 112, i.e. the operator can move empty magazines M's, armature components and/or completed armatures to locations within the first station 112 or for removal therefrom to facilitate efficient operation of the system 100 with no delays due to the operator.

After the upper twist tooling 110 is loaded with hairpin conductors, the turntable 104 is rotated approximately 90°, i.e. one turntable position, clockwise such that the first position 108 of the turntable 104, including the loaded upper twist tooling 110 at the first position 108 of the turntable 104 is moved to a third station 120 of the system 100. The second position 116 of the turntable 104 is moved to the second station 114 of the system 100. A third position 122 of the turntable 104 is moved to the first station 112 of the system 100, the third position 122 of the turntable 104 includes lower twist tooling 124.

After the turntable 104 is stopped and sensed to be appropriately positioned, the operator of the system 100 places an armature core AC, see FIG. 35, onto the third position 122 of the turntable 104 such that the core is positioned on top of the lower twist tooling 124. The system 100 operates the upper twist tooling 110 to rotate legs of the hairpin conductors HC's adjacent the end turns thereof to displace the legs in opposite directions relative to one another by a defined angular displacement corresponding to the upper twist. Operation of the upper twist tooling 110 is performed by a movable rack assembly 125 located in the third station 120 and will be described with reference to FIGS. 14–17. After operation of the upper twist tooling 110 in the third station 120 of the system 100, the hairpin conductors HC's, which are thereby formed into frog leg conductors, are gripped by apparatus in the third station 120 and removed from the upper twist tooling 110 and supported above the turntable 104 as will be described with reference to FIGS. 24–29. While it is to be understood that after the upper twist is performed the hairpin conductors HC's are commonly referred to as frog leg conductors, the term hairpin conductors HC's will be used to refer to either form of the conductors throughout the application for ease of description. The form of the conductor should be apparent from the operations which have been performed and the stage of machine operation.

The turntable 104 is then rotated approximately 90°, i.e. one turntable position, clockwise such that the first position 108 of the turntable 104 is moved to a fourth station 126 of the system 100. The second position 116 of the turntable 104 is moved to the third station 120 of the system 100. The third position 122 of the turntable 104 is moved to the second station 114 of the system 100. And, a fourth position 128 of the turntable 104 is moved to the first station 112 of the system 100. The fourth position 128 includes commutator positioning tooling 130 for receiving commutators C's, see FIG. 36, for armatures to be manufactured by the system 100. The plurality of hairpin conductors HC's are retained at the third station 120 of the system 100.

After the turntable 104 is stopped and sensed to be appropriately positioned, the operator places a commutator C onto the commutator positioning tooling 130 of the fourth position 128 of the turntable 104 in the first station or operator's station of the system 100. In some applications it may be preferred to also insert a commutator sleeve CS into the fourth position 128 of the turntable 104. If used, the commutator sleeve CS retains the ends of the hairpin conductors HC's in conductor receiving slots of the commutator C as will be further described hereinafter. In the preferred embodiment of the present invention, the distal ends of the hairpin conductors HC's, which are supported at the third station 120, are inserted into the alignment means 118 of the second position 116 of the turntable 104 prior to inserting the hairpin conductors HC's into an armature core AC. The alignment means 118 engage the distal ends of the hairpin conductors HC's and ensure proper positioning of the ends for insertion into an armature core AC as will be described more fully hereinafter.

The turntable 104 is then rotated approximately 90°, i.e. one turntable position, clockwise such that the first position 108 of the turntable 104 is moved to the first station 112 of the system 100. The second position 116 of the turntable 104 is moved to the fourth station 126 of the system 100. The third position 122 of the turntable 104 is moved to the third station 120 of the system. And, the fourth position 128 of the turntable 104 is moved to the second station 114 of the system 100. Upon completion of this rotation of the turntable 104 and after the turntable 104 is stopped and sensed to be appropriately positioned, the armature core AC at the third position 122 of the turntable 104 is positioned beneath and adjacent the plurality of hairpin conductors HC's at the third station 120 of the system 100.

Apparatus at the third station 120 which supports the hairpin conductors HC's then is operated to insert the hairpin conductors HC's into the armature core AC and to drive the hairpin conductors HC's through the armature core AC such that they at least partially extend into the lower twist tooling 124 positioned adjacent the armature core AC at the third turntable position 122. During this time, the operator inserts another loaded magazine M into the system 100 on the upper twist tooling 110 at the first turntable position 108 in the operator's station for the next armature A to be manufactured.

The turntable 104 is then rotated approximately 90°, i.e. one turntable position, clockwise such that the first position 108 of the turntable 104, including the loaded magazine M for the next armature A positioned on the upper twist tooling 110, is moved to the second station 114 of the system 100. The second position 116 of the turntable 104 is moved to the first station 12 of the system 100. The third position 122 of the turntable 104 is moved to the fourth station 126 of the system 100, and the fourth position 128 of the turntable 104 is moved to the third station 120 of the system 100.

After the turntable 104 is stopped and sensed to be appropriately positioned, the hairpin conductors HC's are extended fully through the armature core with the distal ends of the hairpin conductors HC's being inserted fully into the lower twist tooling 124 at the fourth station 126 of the system 100 while the hairpin conductors HC's for the next armature are simultaneously loaded into the upper twist tooling 110 from the magazine M by the apparatus located at the second station 114 of the system 100. The lower twist tooling 124 is operated in the fourth station 126 to rotate the distal ends of the legs of the hairpin conductors HC's to displace them in opposite directions relative to one another by a defined angular displacement corresponding to the lower twist. Operation of the lower twist tooling 124 is performed by a movable rack assembly 125' located in the fourth station 126. The movable rack assembly 125' is substantially the same as the movable rack assembly 125 as shown in FIGS. 14–17. The partially completed armature A with hairpin conductors HC's extending through the armature core AC, both upper and lower twists having been performed, is raised to disengage the distal ends of the hairpin conductors HC's from the lower twist tooling 124.

The turntable 104 is then rotated approximately 90°, i.e. one turntable position, clockwise such that the first position 108 of the turntable 104 is moved to the third station 120 of the system 100, the second position 116 of the turntable 104 is moved to the second station 114 of the system 100, the third position 122 of the turntable 104 is moved to the first station 112 of the system 100, and the fourth position 128 of the turntable 104 is moved to the fourth station 126 of the system 100, the commutator C and commutator sleeve CS, if used, on the fourth position 128 being positioned beneath and adjacent to the partially completed armature at the fourth station 126 of the system 100.

After the turntable 104 is stopped and sensed to be appropriately positioned, apparatus in the fourth station 126 of the system 100 is then operated to press the commutator onto the armature core to receive the distal ends of the legs of the plurality of hairpin conductors HC's which are retained by the commutator sleeve CS, if used, and thereby complete the armature A which is positioned in the fourth station 126 of the system 100. This apparatus and its operation will be described with reference to FIG. 30–33. Another armature core AC is loaded onto the third position 122 of the turntable 104 which is positioned in the first station 112 of the system 100 and the upper twist operation and hairpin conductor HC handling procedures described above are performed on the hairpin conductors HC's in the third station 120 of the machine 100.

The turntable 104 is then rotated approximately 90°, i.e. one turntable position, clockwise such that the first position 108 of the turntable 104 is moved to the fourth station 126 of the system 100. The second position 116 of the turntable 104 is moved to the third station 120 of the system 100. The third position 122 of the turntable 104 is moved to the second station 114 of the system 100. And, the fourth position 128 of the turntable 104 is moved to the first station 112 of the system 100. Thus, the armature which was just completed in the fourth station 126 of the system 100 and remains on the fourth position 128 of the turntable 104 is moved to the first station 112 of the system 108.

After the turntable 104 is stopped and sensed to be appropriately positioned, the completed armature is removed by the operator of the system 100 at the operator's station or first station 112 of the system 100. The operator then places a commutator and commutator sleeve, if used, for the next armature onto the commutator positioning tooling 130 of the fourth position 128 of the turntable 104. During this time, the plurality of hairpin conductors HC's for the next armature being manufactured are retained at the third station 120 of the system 100 in preparation for movement of the armature core on the third position 122 into the third station 120.

Also as described above, in the preferred embodiment of the present invention, the distal ends of the hairpin conductors HC's, which are supported at the third station 120, are inserted into the alignment means 118 prior to insertion of the hairpin conductors HC's into an armature core. The alignment means 118 engage the distal ends of the hairpin conductors HC's and ensure proper positioning of the ends for insertion into an armature core. Operation of the system 100 continues repetitively in accordance with the foregoing description with an armature being produced approximately every minute in a working embodiment of the present invention.

Thus, for start-up, an operator inserts a loaded magazine M into the system; the turntable advances two positions with housekeeping duties being performed by the operator during this time; the operator inserts an armature core into the system; the turntable advances one position; the operator inserts a commutator and commutator sleeve, if used, into the system. At this point, all components for the first armature have been inserted into the system. Operation of the machine continues as the turntable advances one position; the operator inserts a loaded magazine M for the next armature into the system; the turntable advances two positions with housekeeping duties being performed by the operator during this time; the operator inserts an armature core for the next armature into the system; the turntable advances one position. At this time, the first completed armature is presented to the operator who removes the completed armature and inserts a commutator and commutator sleeve, if used, into the system in place of the completed armature. At this point, all components for the second armature have been inserted into the system. System operation continues as long as armature components are available or until the desired number of armatures have been assembled.

With this overview of system operation in mind, the turntable positions and system stations will now be described in detail to clarify operation of the system.

First Turntable Position

The first turntable position 108 including the upper twist tooling 110 is shown in FIGS. 6 and 7 which will now be described. The upper twist tooling 110 comprises an inner cylinder 132 and a cylindrical outer housing 134 which are secured to the turntable 104. The inner cylinder 132 includes a plurality of slots 136 formed in its outer cylindrical surface each slot receiving one leg, the inner leg, of a hairpin conductor. An outer sleeve 138 is mounted for rotation about the inner cylinder 132 and includes a plurality of slots 140 corresponding to the slots 136 in the inner cylinder and aligned therewith when the upper twist tooling 110 is in its initial position. Each of the slots 140 receive one leg, the outer leg, of a hairpin conductor HC as shown in FIG. 7. As the hairpin conductors HC's are forced into the slots 136 and 140, the legs are forced toward one another by the slots 136, 140 as shown in FIG. 7.

The outer sleeve 138 includes a drive gear 142 which is engaged by a transmission gear 144. The transmission gear 144 is secured to a transmission drive shaft 146 which extends through the turntable 104 and is mounted for rotation by bearings 148. A drive gear 150 is secured to the shaft 146 beneath the turntable 104 and is engaged by a moveable rack 152 which is a part of station 120 and is best shown in FIGS. 14–17. The gear 144 and shaft 146 are enclosed by a housing 154 which also encloses a rotation indicator taking the form of a spring loaded bolt 156 in the illustrative embodiment. The bolt 156 is secured to a sliding block 158 which is terminated in a rotating cam follower 160. The cam follower 160 is received in an indentation 162 which is formed in an annular collar 164 secured to the outer sleeve 138 of the upper twist tooling 110. Thus, the bolt 156 is initially retracted to indicate that the upper twist tooling 110 is in its initial position and extended during twisting operations. A second indentation 165 also permits the bolt 156 to retract when the upper twist tooling 110 has reached a fully rotated position defined by the second indentation 165.

A thin sleeve 166 approximately 0.020" in thickness is secured between the inner cylinder 132 and the outer sleeve 138 to separate the legs of the hairpin conductors HC's during operation of the upper twist tooling 110 to prevent insulation on the hairpin conductors HC's from being damaged. A spring-loaded magazine M ejection shaft 168 is centrally mounted within the inner cylinder 132 to assist in complete removal of the hairpin conductors HC's from the magazine M at the second station 114 of the system 100.

The second turntable position 116 including the alignment means 118 for forcing the distal ends of the hairpin conductors HC's together and into proper alignment for insertion into an armature core is shown in FIGS. 8 and 9 which will now be described. The alignment means 118 comprises a generally cylindrical housing 170 to which an alignment jig 172 is secured. The alignment jig 172 includes a plurality of slots 174 sized to receive the distal ends of the hairpin conductors HC's after the hairpin conductors HC's have been formed into frog leg conductors by the upper twist tooling 110. The distal ends of the hairpin conductors HC's at this point have been twisted in opposite directions relative to one another such that the ends of two different hairpin conductors HC's are now aligned with one another. These ends are received within the slots 174 even though the ends may be separated radially from one another by some small distance.

The preferred embodiment of the alignment means 118 includes a rotatable member 176 which defines a series of serrated teeth or dogs 178 around its outer periphery. The dogs 178 preferably correspond in number to the number of hairpin conductors HC's used for a given armature; however, a lesser number of dogs can be used provided the rotatable member 176 is rotated through a sufficient arc such that the dogs engage all of the hairpin conductors HC's and force their distal ends together to facilitate insertion of the hairpin conductors HC's into an armature core AC. The rotatable member 176 is secured to a shaft 180 which is mounted for rotation within the housing 170 by means of bearings 182. The shaft 180 includes a drive gear 184 which is engaged by a transmission gear 186. The transmission gear 186 is secured to a transmission drive shaft 188 which extends through the turntable 104 and is mounted for rotation by bearings 190.

A drive gear 192 is secured to the shaft 188 beneath the turntable 104 and is engaged by a moveable rack 152 which is a part of station 120 and is best shown in FIGS. 14–17. The gear 186 and shaft 188 are enclosed by a housing 194 which also encloses a rotation indicator taking the form of a spring loaded bolt 196 in the illustrative embodiment. The bolt 196 is secured to a sliding block 198 which is terminated in a rotating cam follower 200. The cam follower 200 is received in an indentation 202 which is formed in an annular collar 204 secured to the shaft 180 of the alignment means 118. Thus, the bolt 196 is initially retracted to indicate that the alignment means is in its initial position and extended during active alignment operations.

As previously noted, it will be possible to operate a system in accordance with the present invention without alignment means. Further, a variety of alignment means can be used in the present invention. It is initially noted that even in the disclosed embodiment alternate numbers of serrated teeth can be used. In addition, the inner and/or outer ends of the slots 174 can be downward tapered such that alignment can be performed without mechanical movement of the alignment means. Additional alignment arrangements will undoubtedly be suggested to those skilled in the art by the disclosure of the present application.

Third Turntable Position

Figure 10:
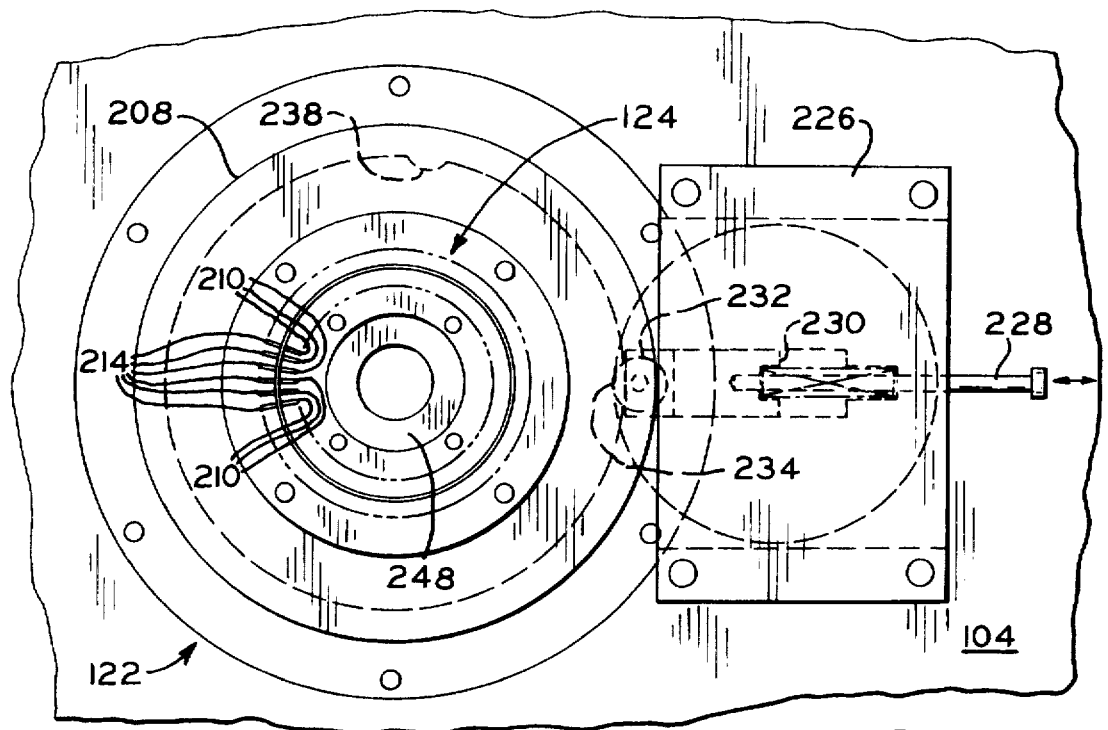
FIG. 10 is a plan view of a third position of the turntable of the machine of FIG. 1.
Figure 11:
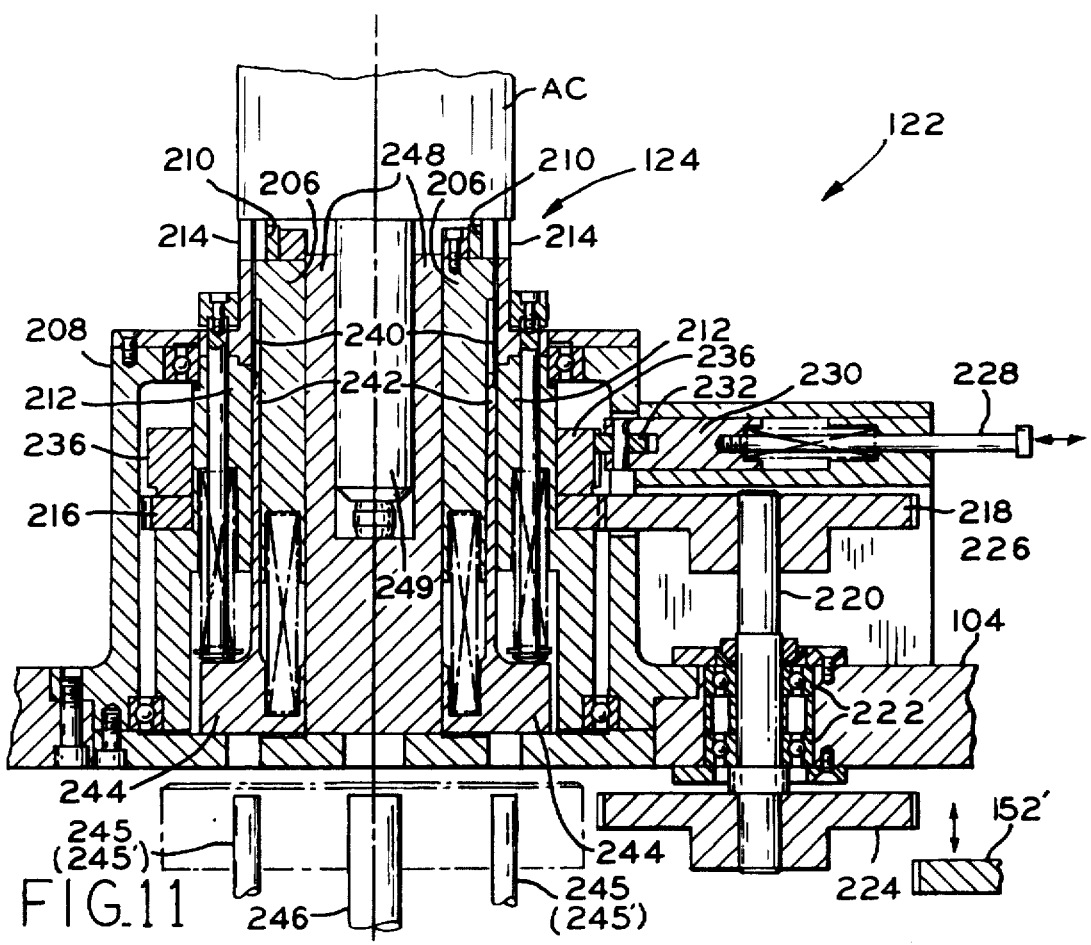
FIG. 11 is a sectioned side view of the third position of the turntable of the machine of FIG. 1.
Figure 11A:
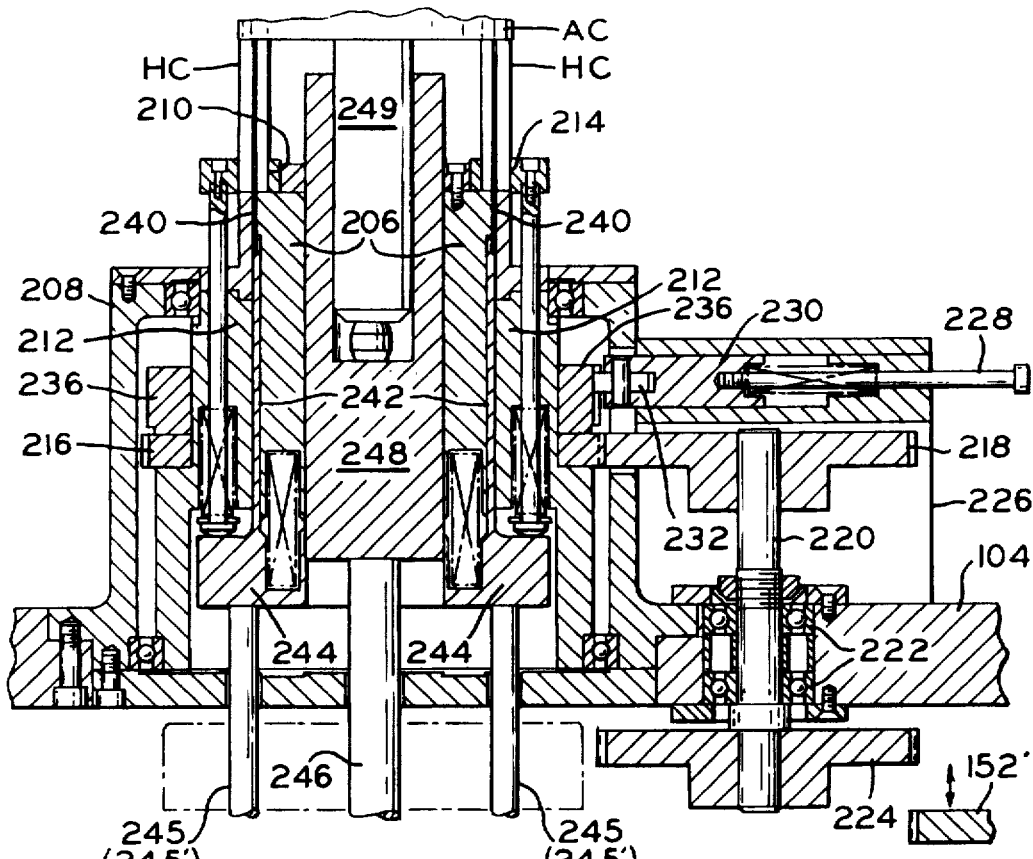
FIG. 11A is a sectional side view of the third position of the turntable of the machine of FIG. 1 comparable to FIG. 11 with portions of the third position raised by hydraulic cylinders located beneath the turntable of the machine, see drawing sheet 9.

The third turntable position 122 including the lower twist tooling 124 is shown in FIGS. 10, 11 and 11A which will now be described. The lower twist tooling 124 includes an inner sleeve 206 and a cylindrical outer housing 208 which are secured to the turntable 104. The inner sleeve 206 includes a plurality of shallow slots 210 formed in an upper end of its outer cylindrical surface each slot 210 receiving a short end section of one leg, the inner leg, of a hairpin conductor HC which extends beyond the armature core AC into which it has been inserted. An outer sleeve 212 is mounted for rotation about the inner sleeve 206 and includes a plurality of shallow slots 214 corresponding to the shallow slots 210 in the inner sleeve 206 and aligned therewith when the lower twist tooling 124 is in its initial position. Each of the shallow slots 214 receive a short end section of one leg, the outer leg, of a hairpin conductor as shown in FIG. 10.

The outer sleeve 212 includes a drive gear 216 which is engaged by a transmission gear 218. The transmission gear 218 is secured to a transmission drive shaft 220 which extends through the turntable 104 and is mounted for rotation by bearings 222. A drive gear 224 is secured to the shaft 220 beneath the turntable 104 and is engaged by a moveable rack 152' which is a part of the fourth station 126 and is best shown in FIGS. 14–17. The gear 218 and shaft 220 are enclosed by a housing 226 which also encloses a rotation indicator taking the form of a spring loaded bolt 228 in the illustrative embodiment. The bolt 228 is secured to a sliding block 230 which is terminated in a rotating cam follower 232. The cam follower 232 is received in an indentation 234 which is formed in an annular collar 236 secured to the outer sleeve 212 of the lower twist tooling 124. Thus, the bolt 228 is initially retracted to indicate that the lower twist tooling 124 is in its initial position and extended during twisting operations. A second indentation 238 also permits the bolt 228 to retract when the lower twist tooling 124 has reached a fully rotated position defined by the second indentation 238.

A thin separator sleeve 240 approximately 0.020" in thickness is movably supported between the inner sleeve 206 and the outer sleeve 212 to separate the ends of the legs of the hairpin conductors HC's during operation of the lower twist tooling 128 to prevent insulation on the ends of the hairpin conductors HC's from being damaged. The sleeve 240 is supported upon a thin cylindrical extension 242 which forms a part of a base platform 244. The sleeve 240 is raised by rods 245 and 245' shown in FIGS. 11 and 11A. The rods 245 are raised and lowered by a hydraulic cylinder located beneath the turntable 104 in the third system station 120 and the rods 245' are raised and lowered by a hydraulic cylinder located beneath the turntable 104 in the fourth system station 126.

The sleeve 240 is raised in the third system station 120 to press against the bottom of an armature core AC to prevent insulating material inserted into the slots of the core from being forced out of the core slots as the hairpin conductors HC's are initially inserted into and forced through the slots. The sleeve 240 is lowered for rotation of the turntable 104. The sleeve 240 is once again raised in the fourth station 126 to separate the ends of the hairpin conductors HC's during the lower twist operation. The sleeve 240 is lowered in the fourth station 126 to permit the hairpin conductors HC's to be bent radially inwardly by pressing blades which force the outer hairpin conductor leg into the inner hairpin conductor leg such that both legs are moved and bent a distance approximately equal to the width of a hairpin conductor HC. The pressing blades, which will be more fully described with reference to the fourth system station 126, thus position the ends of the hairpin conductors HC's for alignment with conductor receiving slots 247 of a riser R of a commutator C, see FIG. 36, which is press fitted onto the armature core AC.

The armature core AC into which the hairpin conductors HC's have been inserted and bent thereabove, is fully driven onto the hairpin conductors HC's prior to twisting the ends of the hairpin conductors HC's which extend beneath the core. This lifting operation is performed by a centrally located shaft 246 which is driven by a hydraulic cylinder located beneath the turntable 104. The third turntable position 122 includes a centralized armature core lifter member 248 which is slidably received within the inner sleeve 206 and engaged by the shaft 246 through the turntable 104 when positioned in the fourth station 126 of the system 100. The lifter member 248 can be interchanged with other lifter members which are selected to correspond to the armature being assembled and more particularly to the shaft 249, see FIG. 35. For example, as shown in FIGS. 10, 11 and 11A, the lifter member 248 is a hollow cylinder of sufficient depth to receive the shaft 249 of the armature core AC. An end turn engaging member is positioned adjacent and firmly holds the end turns of the hairpin conductors HC's as the armature core AC is elevated to fully insert the hairpin conductors HC's prior to performing the lower twist as will be described with reference to the fourth station 126 of the system 100. In FIG. 11, the lifter member 248 and sleeve 240/thin cylindrical extension 242/base platform 244 are shown in their lowered positions while in FIG. 11A these components are shown in their raised positions.

Fourth Turntable Position

Figure 13A:
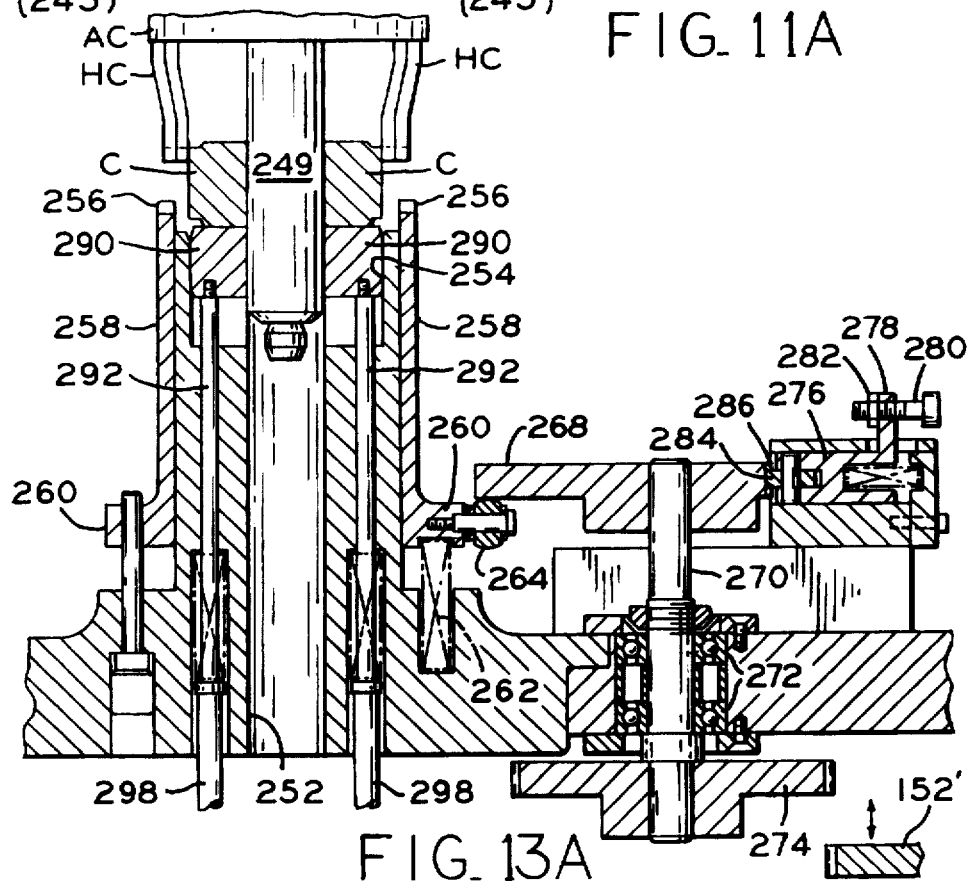
FIG. 13A is a sectioned side view of the fourth position of the turntable of the machine of FIG. 1 comparable to FIG. 13 with a central portion of the fourth position raised by a hydraulic cylinder located beneath the turntable of the machine, see drawing sheet 9.
Figure 14:
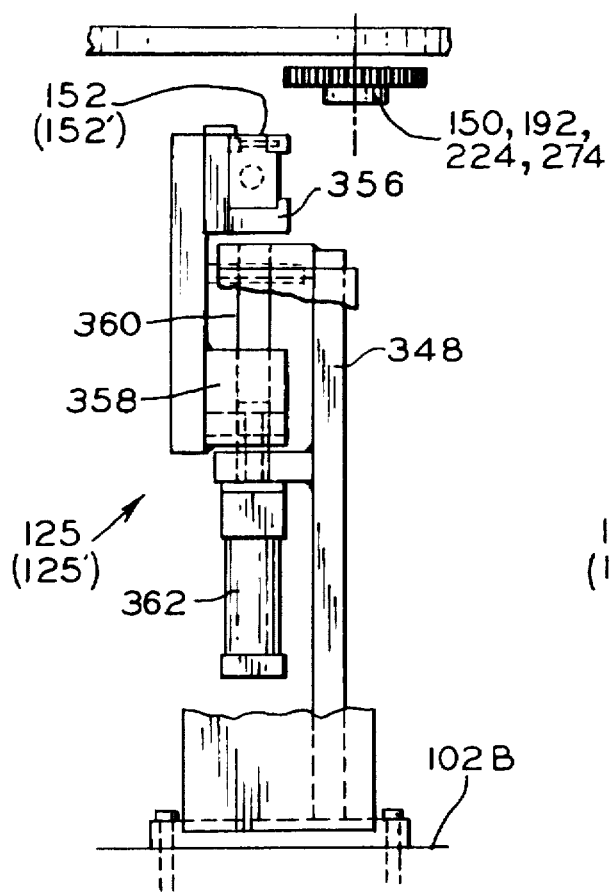
FIGS. 14 and 15 elevational side views of a drive rack located in both the third and fourth system stations shown in the retracted and extended positions, respectively.
Figure 15:
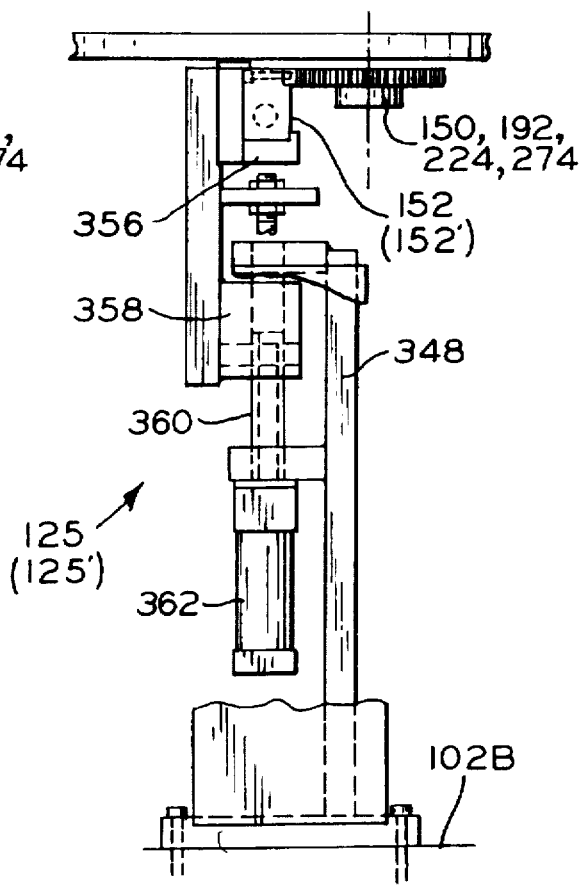

The fourth turntable position 128 including commutator positioning tooling 130 for receiving commutators C's and commutator sleeves CS's, if used, for armatures to be manufactured by the system 100 is shown in FIGS. 12, 13 and 13A which will now be described. The fourth turntable position 128 includes a central cylinder 250 having a central bore 252 extending entirely therethrough and a counterbore 254 in its upper end for receiving the conductor bars 255 of a commutator C, see FIG. 36.

The commutator C is located on the tooling 130 by means of three tabs 256 which are spaced to engage hairpin conductor engaging slots 247 of the commutator C. In the illustrated embodiment, the hairpin conductor engaging slots 247 of the commutator C are within a commutator riser R which structure is commonly provided on such commutators. The tabs 256 are formed on the distal end of an outer sleeve 258 which is slidably mounted to the outside of the central cylinder 250 and includes an expanded annular base 260. The annular base 260 and hence the outer sleeve 258 are spring biased to an extended position by a series of springs 262, only one of which is shown in FIG. 13. The annular base 260 includes a cam follower 264 which is engaged by a cam 268 to retract the tabs 256 and permit the ends of the hairpin conductors HC's to be fully inserted into the riser R of the commutator C as the commutator is press fitted onto the armature core AC. If a commutator sleeve CS is used, it engages and is supported by an expanded portion 258' of the outer sleeve 258 as shown in dotted lines in FIG. 13.

The cam 268 is secured to a shaft 270 which extends through the turntable 104 and is mounted for rotation by bearings 272. A drive gear 274 is secured to the shaft 270 beneath the turntable 104 and is engaged by a moveable rack 152' which is a part of the fourth station 126 and is best shown in FIGS. 14–17. A rotation indicator taking the form of a spring loaded block member 276 having an upwardly turned end piece 278 to which a bolt 280 is threadedly engaged and secured in position by a locking nut 282 in the illustrative embodiment. The block member 276 is terminated in a rotating cam follower 284 which is received in an indentation 286 formed in the back of the cam 268. Thus, the bolt 280 is initially retracted to indicate that the lower twist tooling 124 is in its initial position and extended during twisting operations. A second indentation 288 also permits the bolt 280 to retract when the cam 268 has reached a fully rotated position defined by the second indentation 288.

The commutator C is press fitted onto the armature core AC by means of apparatus shown and described with reference to the fourth station 126. If a commutator sleeve CS is used, the cam 268 is returned toward its initial position to elevate the commutator sleeve CS over the hairpin conductors HC's received within the slots 247 of the commutator riser R; however, not to the point that the tabs 256 are inserted into the slots 247 of the riser R. The armature A may be elevated by means of a commutator support block 290 which is supported within the counterbore 254 of the central cylinder 250 by spring loaded bolts 292. To elevate the armature A to assist in its removal from the counterbore 254, the bolts 292 are engaged by rods 298 positioned in the first system station 112 beneath the turntable 104 and driven by a hydraulic cylinder. The bolts 292 and support block 290 are shown in their lowered position in FIG. 13 and in their raised position in FIG. 13A.

First System Station

Figure 19:
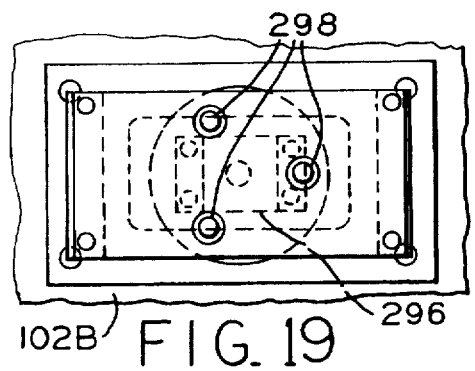
FIG. 19 is a plan view of the first system station of the machine of FIG. 1 taken along the view line 19—19 of FIG. 18.
Figure 18:
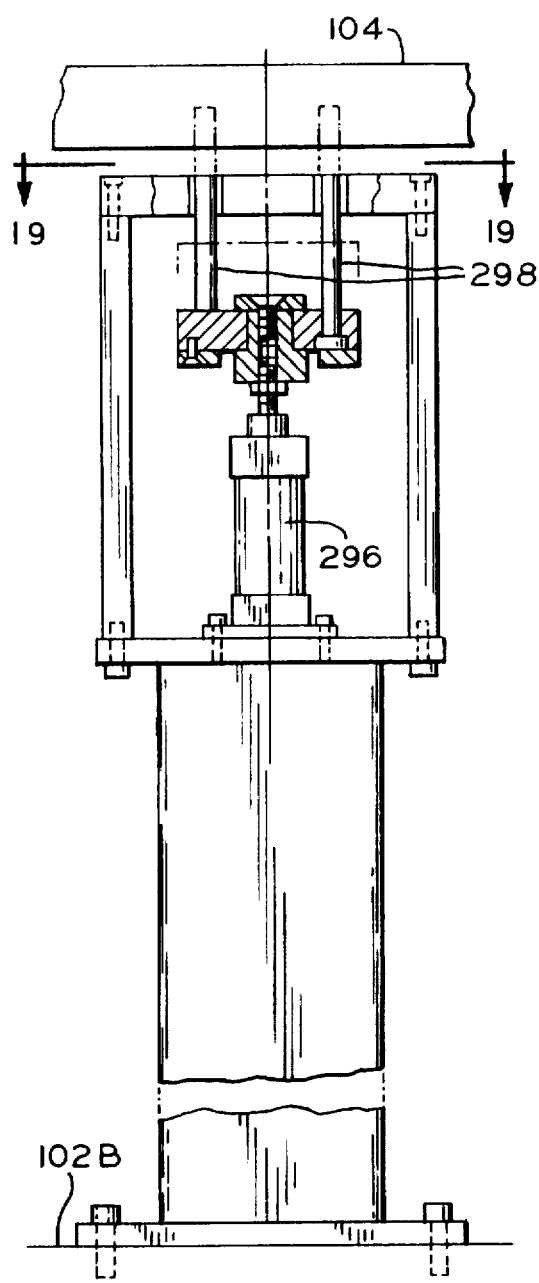
FIG. 18 is an elevational view of the first system station of the machine of FIG. 1.

FIGS. 18 and 19 show the first system station 112 which includes a hydraulic armature lifting cylinder 296. The cylinder 296 is activated by the operator of the system 100 to elevate three rods 298 into engagement with the bolts 292 which are secured to the commutator support block 290 within the counterbore 254 of the central cylinder 250 of the commutator positioning tooling 130 of the fourth turntable position 128. Thus, operation of the cylinder 296 assists the operator in removing completed armatures from the fourth turntable position 128 such that commutators C's can be placed thereon.

Second System Station

Figure 21:
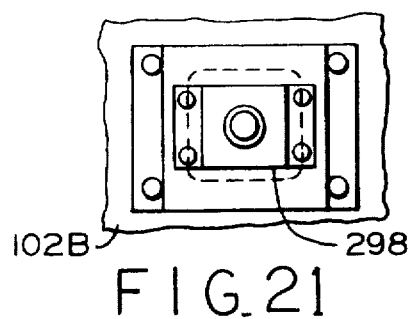
FIG. 21 is a plan view of the lower portion of the second system station of the machine or FIG. 1 taken along the view line 21—21 of FIG. 20.
Figure 20:
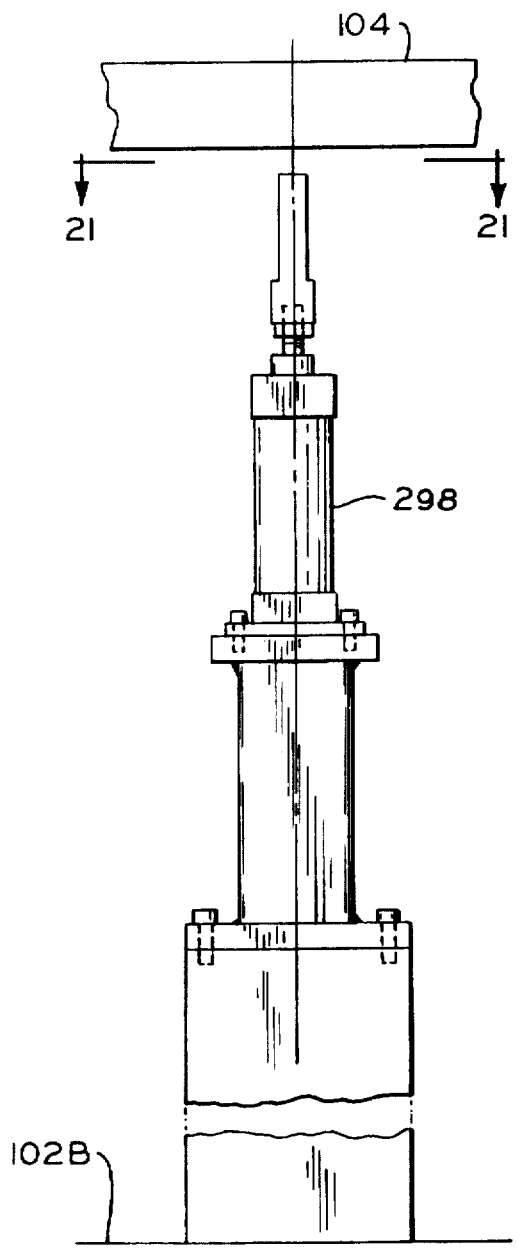
FIG. 20 is an elevational view of the lower portion of the second system, station of the machine of FIG. 1.
Figures 22, 23:
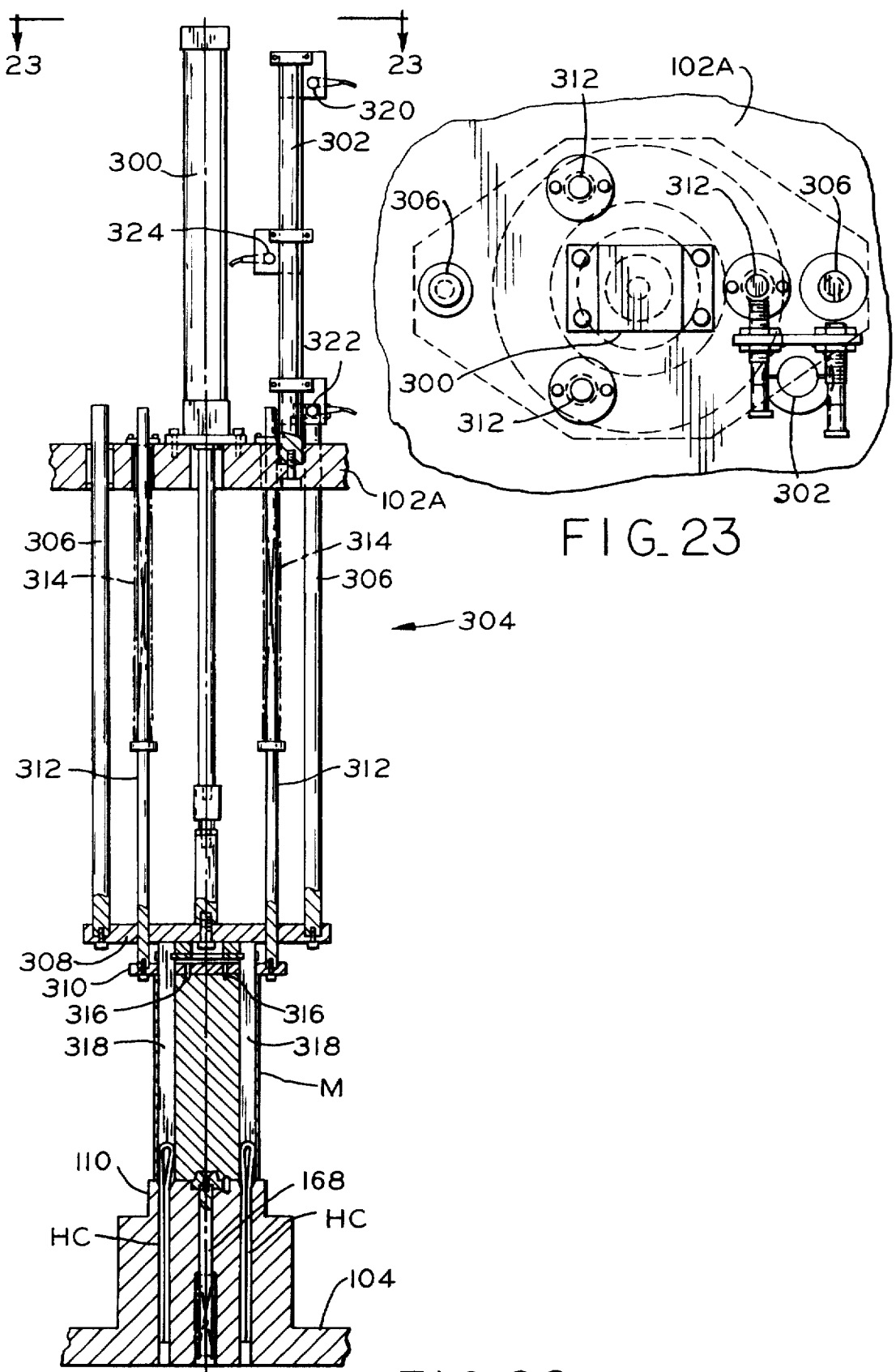
FIG. 22 is a partially sectioned elevational view of the upper portion of the second system station of the machine of FIG. 1 in its fully operated position.
FIG. 23 is a plan view of the second system station of the machine of FIG. 1 taken along the view line 23—23 of FIG. 22.

FIGS. 20 and 21 show the lower portion of the second system station 114 which includes a hydraulic magazine lifting cylinder 298. The cylinder 298 is operated by the system 100 to engage the spring-loaded magazine ejection shaft 168 of the first turntable position 108 as shown in FIG. 7 to assist in complete removal of the hairpin conductors HC's from the magazine M at the second station 114 of the system 100. FIGS. 22, 22A and 23 show the upper portion of the second system station 114 which includes a hydraulic cylinder 300 and sensor supporting shaft 302. The cylinder 300 moves a presser blade assembly 304 relative to a top plate 102A of the support frame 102 and the turntable 104. The presser blade assembly 304 is aligned relative to the support frame 102 by alignment rods 306 and comprises a base plate 308 and a presser blade alignment plate 310 which are coupled to one another by stabilizing rods 312. The rods 312 are secured to the blade alignment plate 310 and slidingly extend through the base plate 308 and the top plate 102A of the support frame 102. The plate 310 is spring biased a fixed distance from the plate 308 by springs 314.

When the cylinder 300 is activated, it extends the base plate 308 and hence the alignment plate 310 toward the table 104 and the magazine M, i.e. from the position shown in FIG. 22A and ultimately to the position shown in FIG. 22. As the alignment plate 310 reaches the top of the magazine M, alignment pins 316 engage corresponding alignment holes in the magazine M to align the alignment plate 310 with the magazine M. As the cylinder 300 is extended further, the base plate 308 is extended toward the plate 310 against the force of the springs 314. A plurality of stripper blades 318 which are secured to the base plate 308 are extended through and guided by the alignment plate 310 into slots M100 of the magazine M, see FIG. 34, to thereby force the hairpin conductors HC's in the magazine M into the upper twist tooling 110 of the first turntable position 108.

The sensor support shaft 302 supports and properly positions proximity sensors 320, 322 and 324. The sensor 320 detects the fully raised position of the base plate 308 while the sensor 322 detects the fully lowered position of the base plate 308. In the fully lowered position of the base plate 308 shown in FIG. 22, the hairpin conductors HC's have been inserted into the upper twist tooling 110 to a point that the end turns of the hairpin conductors HC's extend approximately 1⅞" above the top of the tooling. The sensor 324 detects that the alignment plate 310 has been fully raised such that the turntable 104 can be safely rotated.

FIGS. 4 and 5 illustrate a magazine M gripping arm 326 which is associated with the second system station 114 of the system 100. The arm 326 is supported from the top plate 102A of the support frame 102 by a generally vertical column 328 about which the arm 326 is pivotally moved. The arm 326 can also be raised and lowered within a limited range of movement and is terminated in a pair of grippers 330 which can be selectively closed to engage a magazine M positioned in the second station 114 of the system 100. In use, the first position 108 of the turntable 104 is moved into the second station 114 such that a loaded magazine M positioned on the upper twist tooling 110 is ready to have the hairpin conductors HC's inside the magazine M loaded into the tooling 110. Preferably, prior to operation of the cylinder 300 to transfer the hairpin conductors HC's into the tooling 110, the gripper arm 326 is pivoted into the dash-dot line drawing position of FIG. 5 with the grippers 330 adjacent and surrounding the magazine M. The grippers 330 are then closed to engage the magazine M and thereby hold and stabilize it during the transfer of the hairpin conductors HC's.

After the hairpin conductors HC's have been transferred into the upper twist tooling 110 as described above, the cylinder 298 is activated to engage and elevate the shaft 168 thereby raising the magazine M and ensuring the total removal of the hairpin conductors HC's from the magazine M. The arm 326 is simultaneously raised such that it then holds the empty magazine M within its grippers 330. The arm 326 is then rotated to the solid line drawing position of FIG. 5 such that the empty magazine M is supported over a magazine M return chute 332. The grippers 330 are then opened to deposit the empty magazine M into the chute 332 which conveys the empty magazine M to the operator of the system 100. The operator retrieves the empty magazine M and places it in an appropriate position to be removed from the system 100 and refilled for reuse in manufacturing additional armatures.

Figure 25:
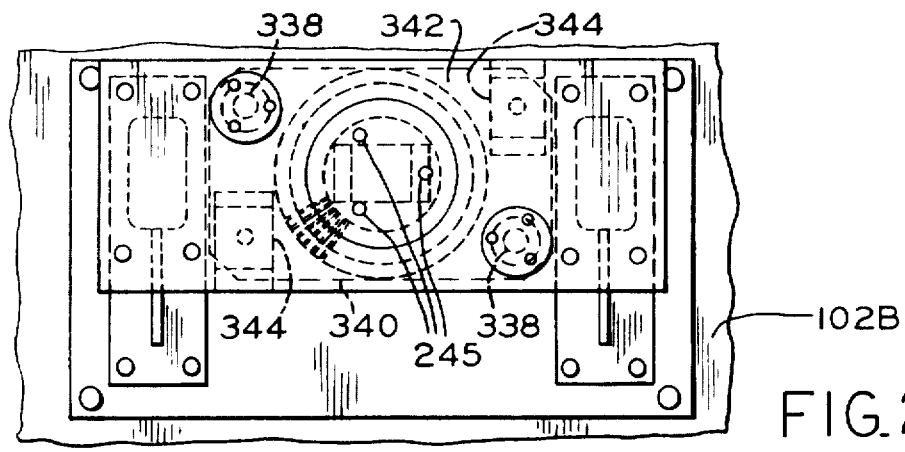
FIG. 25 is a plan view of the lower portion of the third system station of the machine of FIG. 1 taken along the view line 25—25 of FIG. 24.
Figure 24:
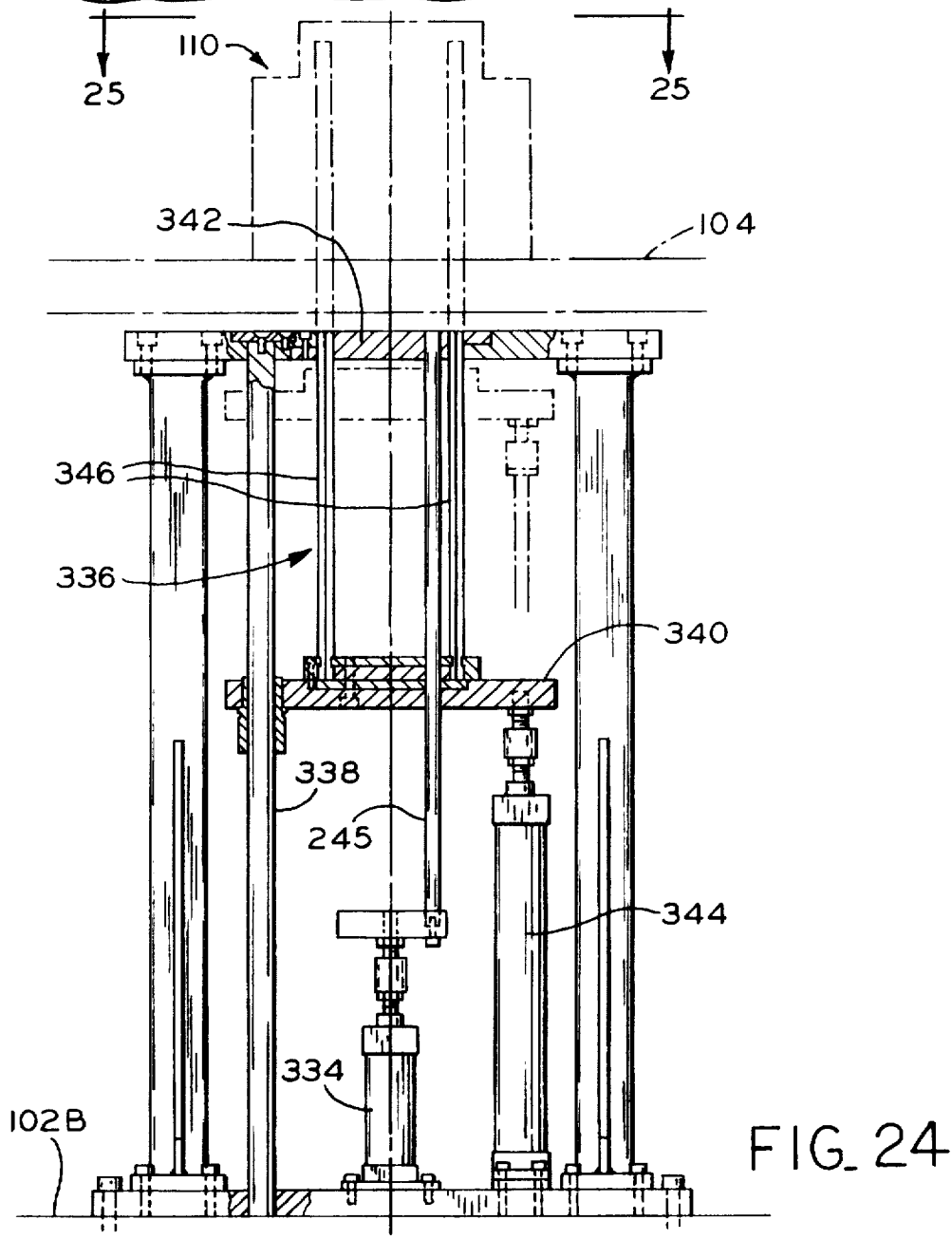
FIG. 24 a partially sectioned elevational view of the lower portion of the third system station of the machine of FIG.

FIGS. 24 and 25 show the lower portion of the third system station 120 which includes a hydraulic cylinder 334 for raising the rods 245 to in turn raise the sleeve 240 as shown in FIG. 11 when the third turntable position 122 is in the third system station 120. In the raised position, the sleeve 240 presses against the bottom of an armature core AC to prevent insulating material inserted into the slots of the core from being forced out of the core slots as the hairpin conductors HC's are initially inserted into and forced through the slots. A presser blade assembly 336 is secured and aligned relative to the support frame 102 by alignment rods 338 and comprises a base plate 340 and a presser blade alignment plate 342 which are coupled to one another by the alignment rods 338. A hydraulic cylinder 344 is connected to extend and retract the base plate 340 and presser blades 346 which are secured to the base plate 340. The presser blades 346 are extended to eject the hairpin conductors HC's from the upper twist tooling 110 after the upper twist has been performed in the third station 120 to form frog leg conductors from the hairpin conductors HC's.

A moveable rack 152 which is a part of the third station 120 and a substantially identical moveable rack 152' which is a part of the fourth station 126 will now be described with reference to FIGS. 14–17. Since the racks 152, 152' are substantially identical in structure and operation, only rack 152 will be described. The rack 152 is mounted for linear movement across a support plate 348 which linear movement is effected by operation of a hydraulic cylinder 350 shown in FIGS. 16 and 17. The home or fully extended position of the rack 152 is defined by a stop 352 and sensed by a proximity sensor 352A which is positioned relative to the fully retracted position of the rack 152 to correspond to a defined angular movement of twist tooling, the upper twist tooling 110 of the first turntable position 108 and the lower twist tooling 124 of the third turntable position 122. To overcome memory of the hairpin conductors HC's, they are twisted beyond a desired twist and then returned to the desired twist position, approximately 16 slots back to approximately 15 slots in the third system station 120 and approximately 16½ slots back to approximately 16 slots in the fourth system station 126. Accordingly, the proximity sensor 352 corresponds to and defines the home or begin twist position of the rack 152. The twisting operation is performed by fully retracting the hydraulic cylinder 350 and hence the rack 152. A hydraulic cylinder 354 is then activated to raise a stop block 354A such that it is in the path of an abutment plate 356 secured to the rack 152. The hydraulic cylinder 350 is then extended until the abutment plate 356 engages the stop block 354A to define the return twist position for the rack 152.

To permit unobstructed rotation of the turntable 104, the rack 152 is vertically moved relative to the turntable 104. For vertical movement, the support plate 348 includes vertical support guides 358 which receive shafts 360 secured to a bottom plate 102B of the support frame 102. A hydraulic cylinder 362 is operated to move the support plate 348 and hence the rack 152 up and down into and out of engagement with drive gears 150, 192, 224 and 274 of the first, second, third and fourth turntable positions 108, 116, 122 and 128, respectively. Engagement of one of the racks 152, 152' with one of the drive gears 150, 192, 224 and 274 in either the third or fourth station 120, 126 is in accordance with tasks to be performed in those stations and should be apparent from the present disclosure.

Figure 26:
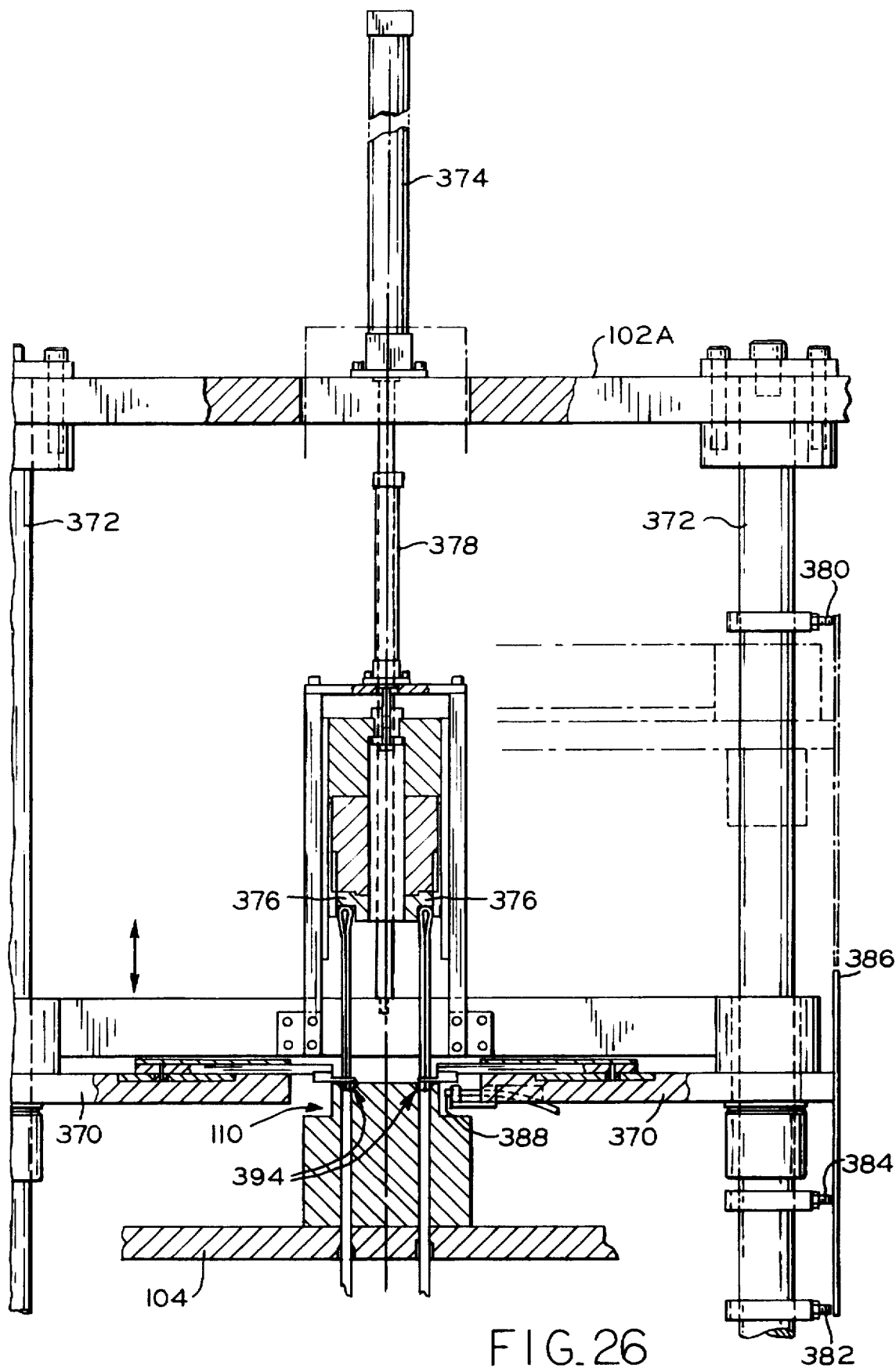
FIG. 26 is a partially sectioned elevational view of the upper portion of the third station of the machine of FIG. 1.
Figure 27:
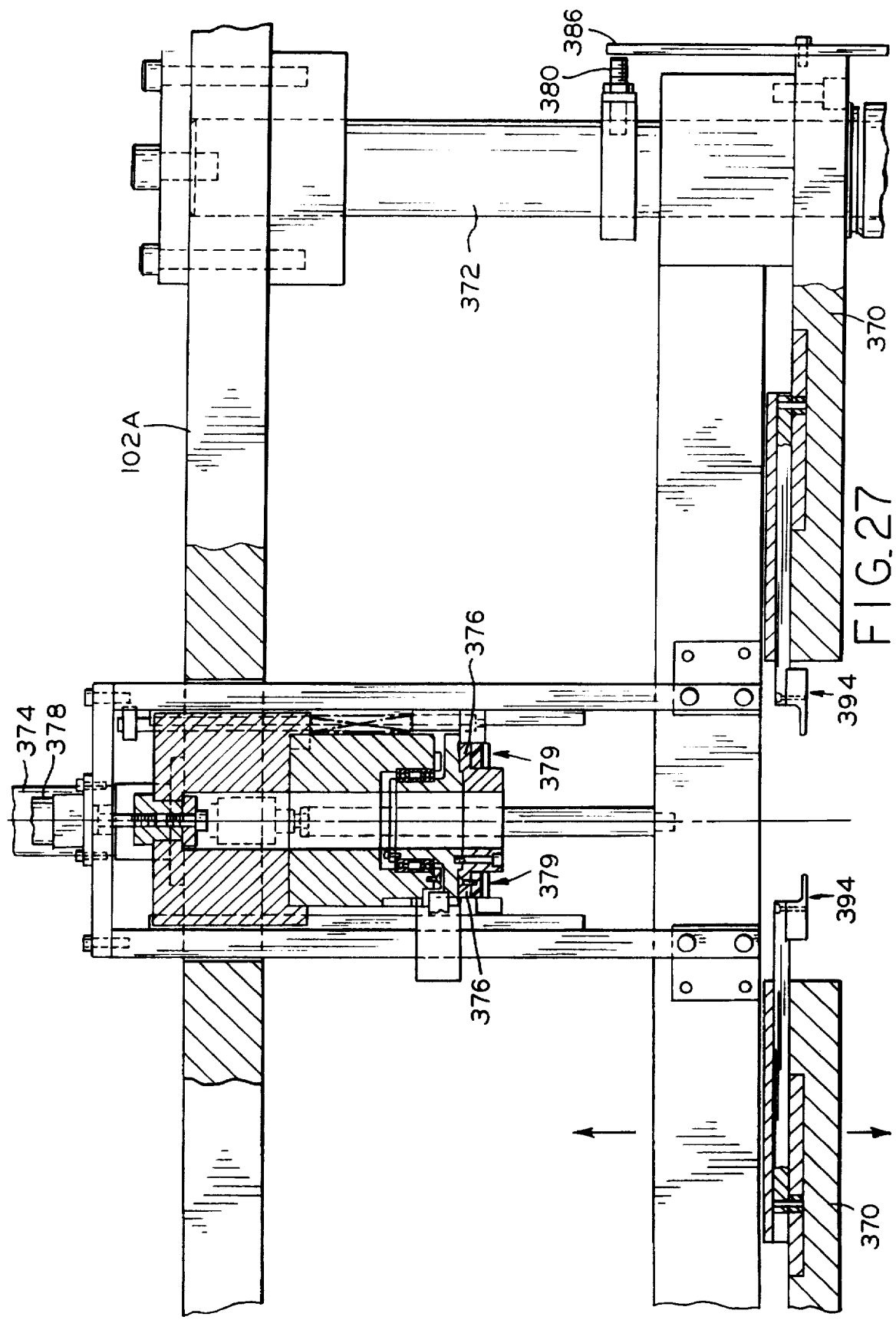
FIG. 27 is a partially sectioned elevational view of part of the upper portion, of the third station of the machine of FIG. 1 on an enlarged scale with an end turn retainer ring shown in its raised position.

FIG. 26 shows the upper portion of the third system station 120 and includes a platen 370 which is mounted for vertical movement along support posts 372. The support posts 372 are secured to and extend between the top plate 102A and the bottom plate 102B. The platen 370 is moved along the posts 372 by a hydraulic cylinder 374 which is secured to the upper plate 102A. As shown in FIGS. 26, 27, 27A and 28, an end turn retainer ring 376 is vertically movable relative to the platen 370 under the control of a hydraulic cylinder 378. The end turn retainer ring 376 is mounted for free rotation such that end turn receiving slots 379 are aligned with and receive end turns of the hairpin conductors HC's. A fully raised position of the platen 370, a fully lowered position of the platen 370, and a 90% lowered position of the platen 370 are detected by proximity sensors 380, 382 and 384, respectively, which are mounted to one of the posts 372 and sense an element 386 which moves with the platen 370. The platen 370 is normally operated at a higher speed between the fully raised position and the 90% lowered position than between the 90% lowered position and the fully lowered position to speed up system operation.

When the system 100 has been operated to a point that the first position 108 of the turntable 104 including upper twist tooling 110 loaded with hairpin conductors HC's has been moved into the third system station 120, the platen 370 is lowered to its fully lowered position adjacent the upper end of the upper twist tooling 110 as shown in FIG. 26. The presence of the upper twist tooling 110 is sensed by a proximity sensor 388 which is mounted to the platen 370. The end turn retainer ring 376 is initially oriented to a defined position by operation of a hydraulic cylinder 390 which engages a lever 392 connected to the end turn retainer ring 376. After the end turn retainer ring 376 is properly oriented, the end turn retainer ring 376 is lower into engagement with the end turns in the upper twist tooling 110. The hydraulic cylinder 390 is retracted prior to performance of the upper twist operation. The end turn retainer ring 376 thus is permitted to rotate during the upper twist operation such that its engagement with the end turns of the hairpin conductors HC's does not interfere with the upper twist operation.

The platen 370 includes cam operated hairpin conductor HC engaging and retaining fingers 394. As shown in FIG. 29, the fingers 394 are extended to grip the hairpin conductors HC's and retracted to release the hairpin conductors HC's. While only a limited number of fingers 394 are shown in FIG. 29 for ease and clarity of the illustration, it is to be understood that the fingers 394 extend entirely around the ring and are equal in number to the number of hairpin conductors HC's such that all the hairpin conductors HC's can be gripped by pairs of the fingers 394. The fingers 394 are operated by a hydraulic cylinder 396 which rotates a cam plate 398 including cam slots 400 into which finger operating pins 402 are received for extension and retraction of the fingers 394. The hydraulic cylinder 396 includes an internal extension sensor (not shown) to detect the position of the cylinder 396. An adjustable stop 404 defines a fully extended position for the hydraulic cylinder 396 and hence the fully inserted, hairpin conductor gripping positions of the fingers 394.

After the upper twist operation has been performed by operation of the rack 152 in cooperation with the upper twist tooling 110, the hairpin conductors HC's or more accurately the resulting frog leg conductors are ejected from the upper twist tooling 110 to a point such that approximately ½" of the conductors remain in the tooling 110. At this point in the operation of the system 100, the hydraulic cylinder 396 is activated to grip the hairpin conductors HC's adjacent the tooling 110 within the fingers 394. The platen 370 is then raised to fully remove the hairpin conductors HC's from the tooling 110 and to retain the hairpin conductors HC's at the third system station 120.

The turntable 104 is moved to position the second position 116 of the turntable 104 into system station three 120 which places the alignment means 118 beneath the distal ends of the hairpin conductors HC's supported within the fingers 394 at the third system station 120. The platen 370 is then lowered to insert the distal ends of the hairpin conductors HC's into the alignment means 118 which is then operated as described with reference to FIGS. 8 and 9 to move the ends together and properly position them for insertion into an armature core AC. The fingers 394 are relaxed slightly during the operation of the alignment means 118 to permit the hairpin conductors HC's to be aligned as noted and then the fingers 394 are retightened to secure or freeze the hairpin conductors HC's in their aligned positions. The platen 370 is once again raised with the hairpin conductors HC's and the turntable 104 is moved to position the third position 122 of the turntable 104 into the third system station 120 which places an armature core AC beneath the distal ends of the hairpin conductors HC's supported within the fingers 394 at the third system station 120.

Provided that the armature cores AC's used to manufacture armatures A's in accordance with the present invention are made to be within defined specifications such that the positioning of the slots within the armature core AC is assured from the lower twist tooling 124 in the third system station 122, the hairpin conductors HC's can be directly inserted into the armature core AC. If such precisely controlled armature cores AC's are not to be used because of cost or availability, the armature core AC can be monitored by a sensor (not shown), for example an optical sensor, located somewhere between the first and third system stations 112, 120 to permit either the armature core AC or the hairpin conductors HC's to be shifted for proper alignment of the two. For example, the platen 370 could be mounted for limited rotation relative to the posts 372. As an alternate to sensing the armature cores AC's somewhere between the first and third system stations 112, 120, the armature cores AC's could be measured or sensed prior to being loaded into the system. Such sensing would generate signals corresponding to those generated by the sensor just described and would be used to either initially position the armature core AC in the system or to shift the armature core AC or the hairpin conductors HC's for proper alignment of the two.

In any event, once an armature core AC is properly positioned within the third system station 120, the platen 370 is lowered toward the armature core AC and the distal ends of the hairpin conductors HC's are inserted into corresponding slots 405 of the armature core AC which slots 405 include insulating material therein. The fingers 394 are then retracted by operation of the hydraulic cylinder 396 and the hydraulic cylinder 378 is activated to drive the hairpin conductors HC's through the armature core AC and at least partially into the lower twist tooling 124 located adjacent and beneath the armature core AC. As previously noted, the sleeve 240 is raised to prevent the insulating material inserted within the slots 405 of the armature core AC from being forced from the slots 405 as the hairpin conductors HC's are inserted therethrough.

While the hairpin conductors HC's can be fully inserted through the armature core AC by operation of the hydraulic cylinder 378, for the manufacture of some armatures it may be desirable to have the fingers 394 assist in the insertion of the hairpin conductors HC's. Use of the fingers 394 to assist insertion of the hairpin conductors HC's may be advantageous for example where a twist is made in the slots 405 of the armature core AC to reduce noise generated by operation of a motor including the armature A. A common twist for noise reduction reasons in armature cores is a twist of one slot location from the end turn end of the armature core AC to the commutator end of the armature core AC. It is obvious that the hairpin conductors HC's would encounter more resistance to insertion in such twisted armature cores than if the slots go straight through the cores.

If hairpin insertion is to be assisted by the fingers 394, the hairpin conductors HC's are initially inserted by lowering the platen 370 and the fingers 394 are withdrawn as described before. The hairpin conductors HC's are then partially inserted by operation of the hydraulic cylinder 378 also as described before. For complete insertion, the platen 370 is raised with the hairpin conductors HC's being gripped once again at a position above the armature core AC. Of course the shorter the distance the platen 370 is raised above the armature core AC the more force can be exerted without damaging the hairpin conductors HC's. Then, the hairpin conductors HC's can be inserted using the fingers 394 typically in cooperation with the end turn retainer ring 376 and the hydraulic cylinder 378.

After the hairpin conductors HC's are driven fully through the armature core AC and at least partially into the lower twist tooling 124 of the third turntable position 122, the fingers 394 are retracted if they were used for hairpin driving and the platen 370 is raised to its fully raised position. The turntable 104 is then rotated to move the third turntable position 120 including the armature core AC and hairpin conductors HC's inserted therethrough into the fourth system station 126.

Fourth System Station

Figure 31:
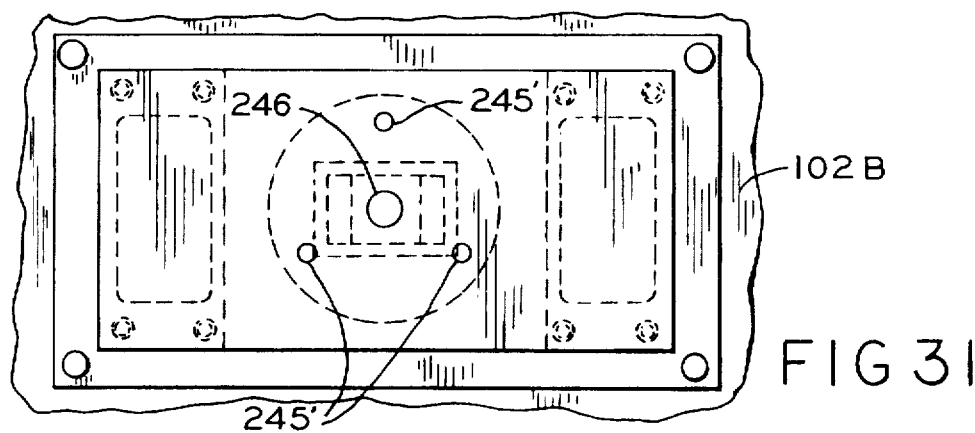
FIG. 31 is a plan view of the lower portion of the fourth system station of the machine of FIG. 1 taken along the view line 31—31 of FIG. 32 is a partially sectioned elevational view of the upper portion of the fourth station of the machine of FIG. 1.
Figure 30:
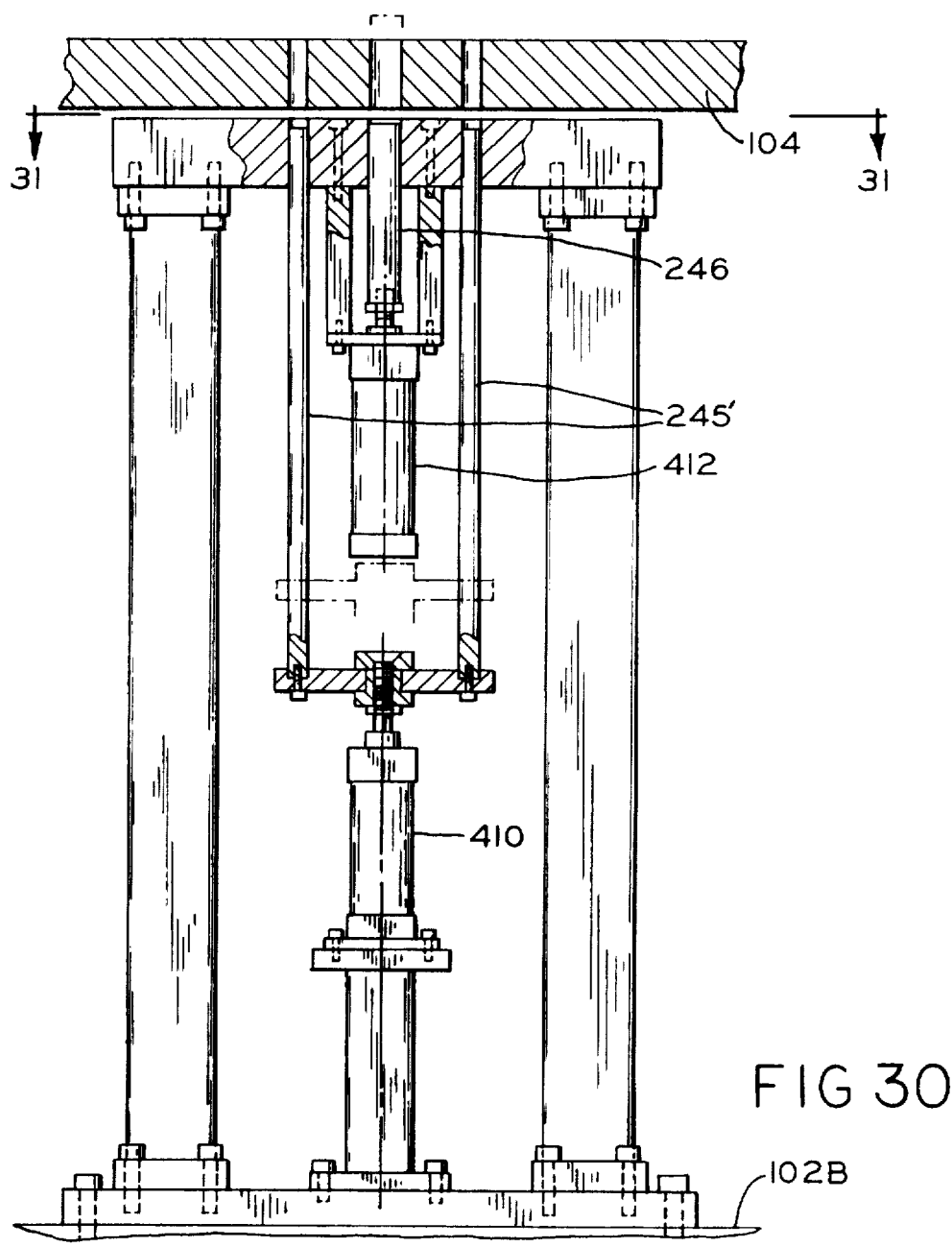
FIG. 30 is a partially sectioned elevational view of the lower portion of the fourth system station of the machine of FIG. 1.

FIGS. 30 and 31 show the lower portion of the fourth system station 126 which includes a hydraulic cylinder 410 for raising the rods 245' to in turn raise the sleeve 240 as shown in FIG. 11 when the third turntable position 122 is in the fourth system station 126. In the raised position, the sleeve 240 separates the distal ends of the hairpin conductors HC's to prevent the insulation of the ends of the conductors from being damaged during the lower twist operation which is performed in the fourth system station 126. A hydraulic cylinder 412 is operated to extend the shaft 246 into engagement with the centralized armature core lifter member 248 of the third turntable position 122 and raise the lifter member 248 as described with reference to FIGS. 10 and 11. A moveable rack 152' which is a part of the fourth station 126 and is substantially identical to the moveable rack 152 which is a part of the third station 120 was previously described above with reference to FIGS. 14–17.

Figure 32:
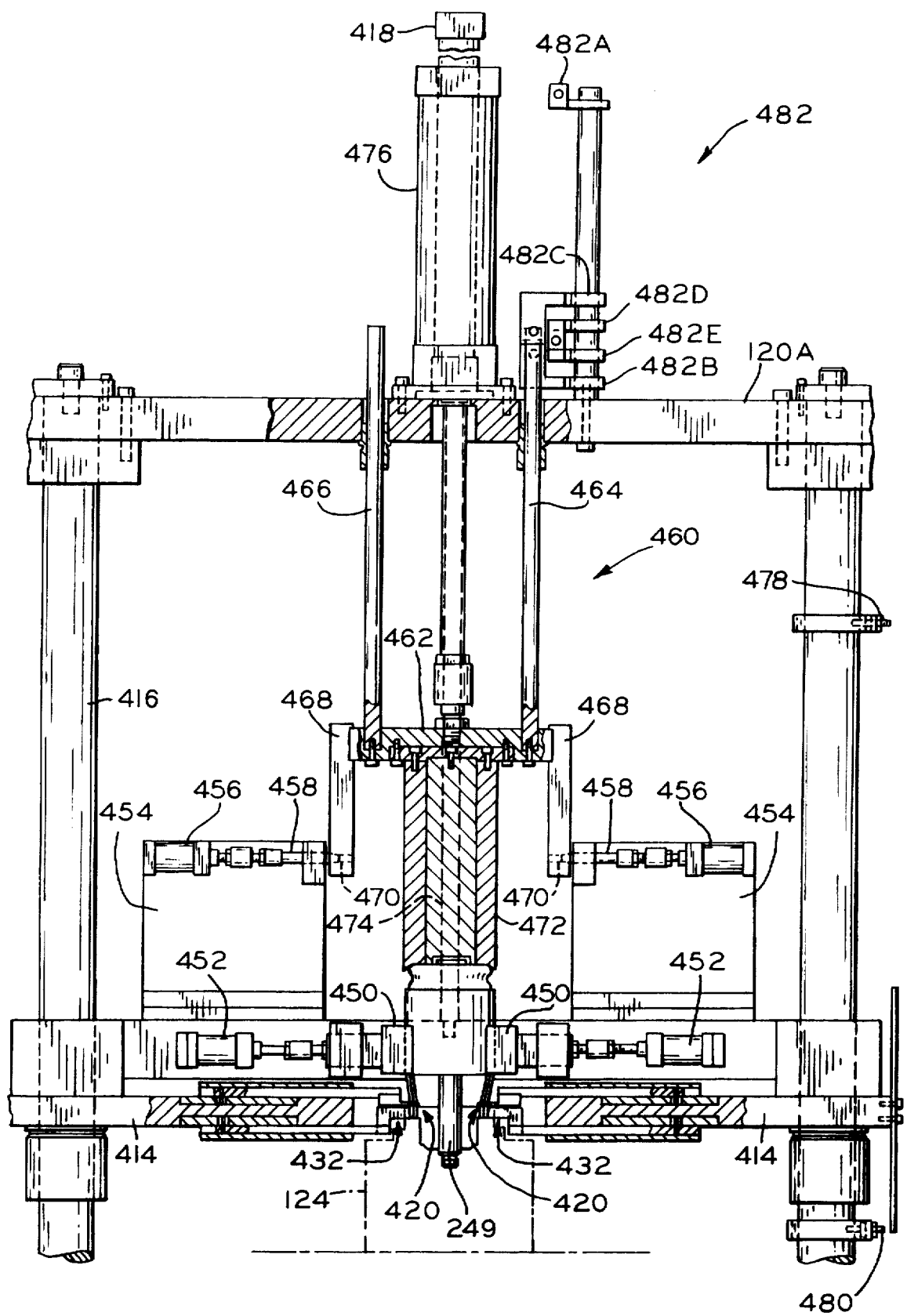
Figure 33:
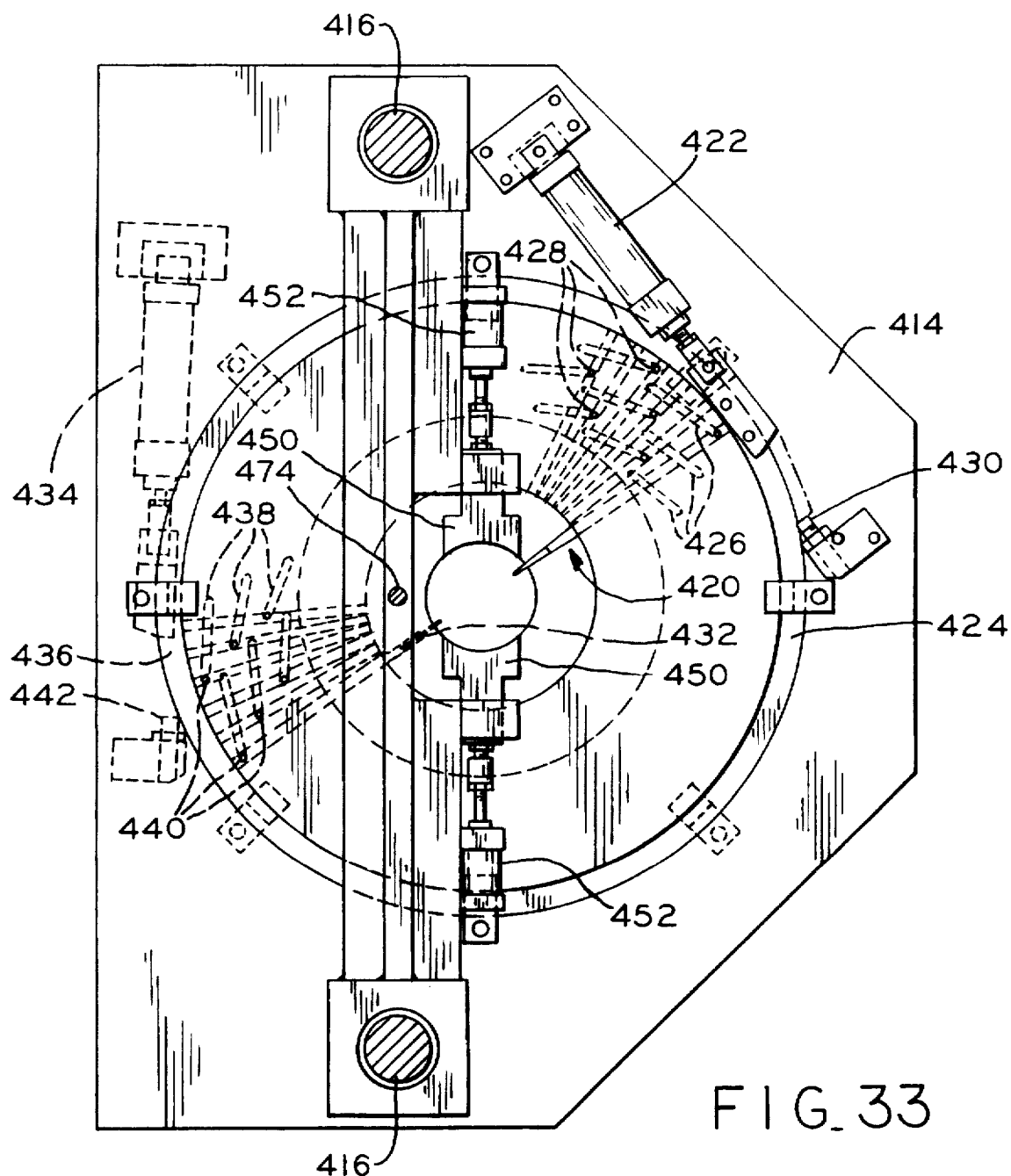
FIG. 33 is a plan view of a platen of the fourth station of the machine of FIG. 1.

FIG. 32 shows the upper portion of the fourth system station 126 which includes a platen 414 mounted for vertical movement along support posts 416. The support posts 416 are secured to and extend between the top plate 102A and the bottom plate 102B. The platen 414 is moved along the posts 416 by a hydraulic cylinder 418 which is secured to the upper plate 102A. The platen 414 includes cam operated hairpin conductor engaging and retaining fingers 420. As shown in FIG. 33, the fingers 420 are extended to grip the hairpin conductors HC's and retracted to release the hairpin conductors HC's. While only one of the fingers 420 is shown in FIG. 33 for ease and clarity of the illustration, it is to be understood that the fingers 420 extend entirely around the ring and are equal in number to the number of hairpin conductors HC's such that all the hairpin conductors HC's can be gripped by pairs of the fingers 420.

The fingers 420 are operated by a hydraulic cylinder 422 which includes an internal extension sensor (not shown) to detect the position of the cylinder 422. Operation of the hydraulic cylinder 422 rotates a cam plate 424 including cam slots 426 into which finger operating pins 428 are received for extension and retraction of the fingers 420. An adjustable stop 430 defines the fully extended position of the cylinder 422 and hence the fully inserted, hairpin conductor HC gripping position of the fingers 420. The operation of the fingers 420 is substantially the same as the operation of the fingers 394 previously described with reference to FIG. 29.

The hairpin conductor engaging and retaining fingers 420 are located on top of the platen 414 in a manner similar to the hairpin conductor engaging and retaining fingers 394 of the platen 370. Located beneath the platen 414 and operating in cooperation with the fingers 420 are a series of pressing blades 432 only one of which is shown in FIG. 33 even though the blades 432 extend entirely around an opening through the platen 414 and are equal in number to the hairpin conductors HC's used for a given armature. The pressing blades 432 are operated by a hydraulic cylinder 434 which includes an internal extension sensor (not shown) to detect the position of the cylinder 434. Operation of the hydraulic cylinder 434 rotates a cam plate 436 including cam slots 438 into which pressing blade operating pins 440 are received for extension and retraction of the pressing blades 432. An adjustable stop 442 determines the fully extended position of the cylinder 434 and hence the fully inserted hairpin conductor engaging position of the pressing blades 432. The operation of the pressing blades 432 is very similar to the operation of the fingers 420 and the fingers 394 as previously described.

The platen 414 also includes armature core clamps 450 which are operated by hydraulic cylinders 452 to clamp an armature core in the fourth station 126 during the lower twist operation performed on the hairpin conductors HC's in the fourth station 126. A pair of vertically extending back plates 454 are secured to the platen 414 and support hydraulic cylinders 456 which extend and retract shot pins 458 for selectively coupling the platen 414 to a combination end turn supporting and presser assembly 460. The assembly 460 comprises a base plate 462 which is aligned relative to the top plate 102A by means of guide rods 464, 466 which slidably extend through the top plate 102A of the support frame 102.

The base plate includes side plates 468 secured to opposite sides thereof for interlocking the assembly 460 to the platen 414 for synchronized operation. The assembly 460 is interlocked to the platen 414 by extension of the shot pins 458 into apertures 470 of the side plates 468. An end turn engaging member 472, preferably made of nylon or other plastic material, includes a centrally extending metal presser shaft 474 for pressing a commutator onto the armature core AC. The member 472 is removably secured to the base plate 462 such that a variety of members corresponding to armatures to be manufactured can be interchangeably used in the fourth station 126 of the system 100. The end turn supporting and presser assembly 460 is operated by a hydraulic cylinder 476 which is secured to the top plate 102A and connected to the base plate 462. The fully raised position of the platen 414 is sensed by a proximity sensor 478 and the fully lowered position of the platen 414 is sensed by a proximity sensor 480.

The position of the base plate 462 is sensed by a sensor arrangement 482 located on top of the top plate 102A and including a moveable member which is coupled to the guide rod 464. The sensor arrangement 482 includes a first proximity sensor 482A for sensing a fully elevated position of the base plate 462; a second proximity sensor 482B for sensing a fully lowered position of the base plate 462; a third proximity sensor 482C for sensing a third position controlling the speed of movement of the base plate 462, i.e. the base plate 462 is moved rapidly between the fully elevated position and the third position but at a slow rate below the third position; a fourth proximity sensor 482D which defines the position at which the end turn engaging member 472 engages the end turns of the hairpin conductors HC's for full insertion of the hairpin conductors HC's into the armature core AC; and, a fifth proximity sensor 482E which defines a position closely adjacent the fully lowered position. The position of the base plate 462 and the platen 414 must be coordinated such that the shot pins 458 are aligned with the apertures 470 for coupling the platen 414 to the assembly 460. Thus, the fifth proximity sensor 482E defines the proper position of the base plate 462 for operation of the shot pins 458.

In the fourth station 126, the hairpin conductors HC's are fully inserted through the armature core AC, the distal ends of the hairpin conductors HC's extending toward the commutator end of the armature core AC are twisted in the lower twist operation, and the commutator C is press fitted onto the armature core AC. These operations commence when the third turntable position 122 is moved from the third system station 120 to the fourth system station 126 with the hairpin conductors HC's or frog legs inserted through an armature core AC and extending into the lower twist tooling 124 of the third turntable position. After the turntable 104 is stopped and sensed to be appropriately positioned, the end turn engaging member 472 is lowered to engage the end turns of the hairpin conductors HC's and force them fully into the lower twist tooling 124 if the hairpin conductors HC's are not yet fully inserted.

The cylinder 412 is operated to raise the armature core on the hairpin conductors HC's which are restrained from movement by the member 472 and the separator sleeve 240 is then raised via the rods 245' by operation of the cylinder 410. In this way, the hairpin conductors HC's are extended fully through the armature core AC and fully into the lower twist tooling 124 at the fourth station 126 and the sleeve 240 is positioned to protect the insulation on the distal ends of the hairpin conductors HC's. The rack 152' raised to its uppermost position is then operated as previously described to rotate the drive gear 224 and thereby perform the lower twist of the hairpin conductors HC's. The lower twist of the hairpin conductors HC's is performed to separate the distal ends of the hairpin conductors HC's and to position the armature core AC for alignment with a commutator C, which will later be press fitted onto the armature core AC. To this end, a sensor 490 shown in FIG. 1, such as a luminescent, optical or other appropriate sensor detects and monitors the slots or other markings on the outside surface of the armature core.

During the lower twist operation, the armature core AC is supported by the hairpin conductors HC's upon the lower twist tooling 124 such that the armature core AC rotates and drops as the hairpin conductors HC's are being twisted. As the lower twist operation is performed, rotation of the slots, or other markings representing the slots for example in the case of closed slots, are monitored by the sensor 490. After the armature core has been rotated seven (7) slot positions, the lower twist operation is stopped, the end turn engaging member 472 is lowered to its lowered position adjacent its fully lowered position, the clamps 450 are closed via the cylinders 452 to clamp the armature core AC in this position, and the shot pins 458 are extended via the cylinders 456 to engage the apertures 470 and thereby interlock the assembly 460 with the platen 414 such that the two are moved together for subsequent operations. The rack 152' is reactivated to twist the armature core 16½ slots which is then backed off to 16 slots via operation of the hydraulic cylinder 354'. At this point, the lower twist is complete and the rack 152' can be lowered to permit the turntable 104 to be rotated. Preferably, the rack 152' is held in its raised position until operations in the fourth system station 126 are completed to assure proper alignment of the elements of the third turntable position 122.

Prior to rotation of the turntable 104, the separator sleeve 240 is lowered. To prepare the armature core for receiving a commutator C waiting in the third system station 120 on the fourth turntable position 128, the fingers 420 and pressing blades 432 are extended. The pressing blades 432 engage the distal ends of the hairpin conductors HC's which can now be forced together and bent radially inwardly toward the center of the armature core as shown in FIGS. 13, 32 and 37 since the separator sleeve 240 has been lowered. The pressing blades 432 bend the distal ends of the hairpin conductors HC's radially inwardly by approximately the width of one leg of the hairpin conductors HC's. The fingers 420 then hold the inwardly bent distal ends of the hairpin conductors HC's with the pressure being released on the pressing blades 432. The pressing blades 432 are not retracted and rest against the hairpin conductors HC's to assist the fingers 420. The armature core AC, retained by the clamps 450 and the fingers 420, is raised by the simultaneous retraction of the cylinders 418 and 476 which raises the pinned combination of the platen 414 and the assembly 460. The distal ends of the hairpin conductors HC's are thus removed from the lower twist tooling 124.

The turntable 104 is then rotated one turntable position, clockwise such that the fourth position 128 of the turntable 104 is moved to the fourth station 126 of the system 100, the commutator C on the fourth position 128 being positioned beneath and adjacent to the partially completed armature at the fourth station 126 of the system 100. After the turntable 104 is stopped and sensed to be appropriately positioned, the rack 152' is moved to its raised position and operated to rotate the drive gear 274 thereby rotating the cam 268 to retract the commutator locating tabs 256. The cylinders 418 and 476 are operated to press the commutator C onto the armature core AC such that the distal ends of the legs of the hairpin conductors HC's are received within the slots 247 of the riser R of the commutator C.

In some applications it may be preferred to include a thin hairpin retainer band or commutator sleeve CS which surrounds and extends above the tabs 256. If the commutator sleeve CS is used, the rack 152 is operated to partially raise the outer sleeve 258 which supports the commutator sleeve CS such that it is extended over the hairpin conductors HC's but not so far as to make the tabs 256 engage the hairpin conductors HC's. The fingers 420 and pressing blades 432 are then retracted at which time the hairpin conductors HC's tend to withdraw slightly for the slots 247 of the riser R of the commutator C. However, if the commutator sleeve CS is used, the hairpin conductors HC's engage and are retained by the commutator sleeve CS to facilitate welding or otherwise connecting the hairpin conductors HC's to the commutator C, which operation is not performed by the system 100 of the present invention. The rack 152' is lowered and the completed armature A is positioned in the fourth station 126 of the system 100. The completed armature A is then moved to the first system station 112 where the operator activates the cylinder 296 to assist in removal of the armature A from the system.

Throughout this application, the term electrodynamic machine has been used. However, it is to be understood that the more commonly used term "dynamoelectric machine" is synonymous with "electrodynamic machine", and that motors and generators that may be produced by applying out present inventions are more frequently called dynamoelectric machines. It also will be understood that the present invention may be applied to produce armatures or rotors of motors and generators that utilized commutated, wound rotors or armatures, e.g., appliance drive motors, automotive starting motors, motors for toys or industrial applications other than those specifically discussed herein, and so forth.

A United States patent that contains a disclosure of a dynamoelectric machine that may be produced while utilizing the inventions disclosed herein is Bradtmueller et al. U.S. Pat. No. 5,045,742 on Sep. 3, 1991; the entire disclosure of which is incorporated herein by reference.

Figure 38:
Figure 39:
Figure 40:
Figure 41:
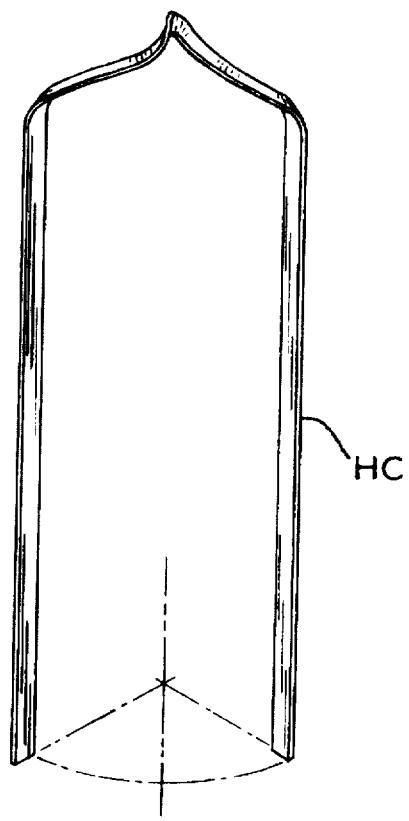
Figure 42:
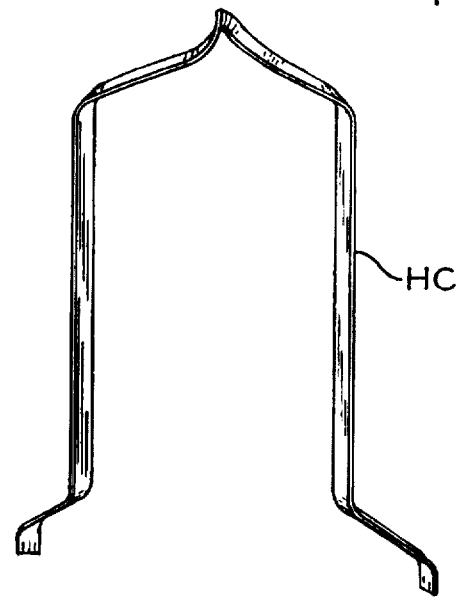
Figure 47:
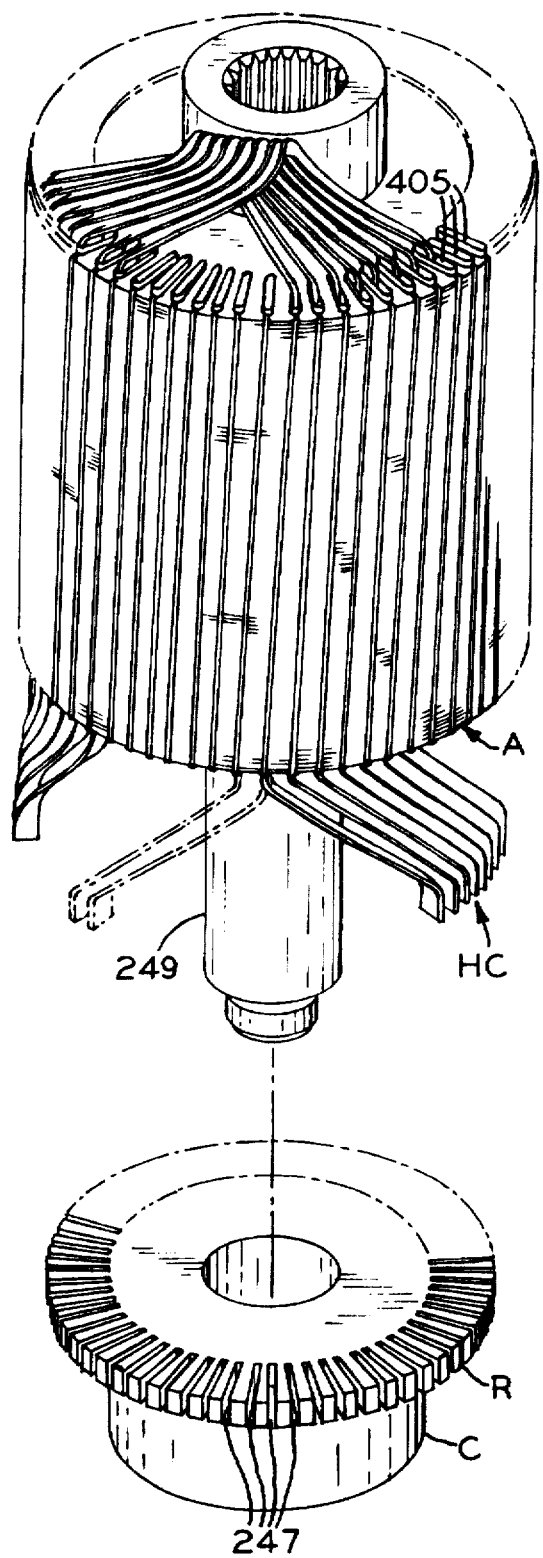
Figure 48:
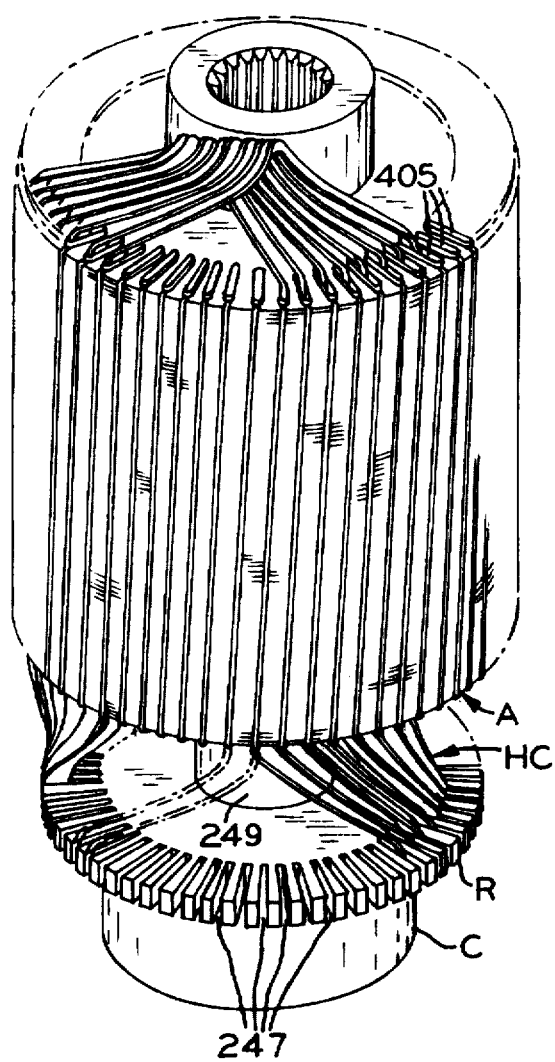

FIGS. 38, 39, and 40 show the sequences of shapes that a segment of conductor assumes during transformation from a straight conductor to a hairpin conductor (HC);

FIGS. 41 and 42 illustrate, sequentially, the changes in shapes or configurations that each hairpin conductor undergoes during the practice of our invention;

FIG. 43 shows the relative positions of a group of hairpin conductors when they are first loaded into the magazine M of FIG. 34;

FIG. 44 shows the frog leg, spread-legged configuration of the preselected group of frog leg conductors just before and during the step of being inserted into an armature core;

FIGS. 45 and 46 respectively show a group of spread-legged frog-leg conductors just prior to and just after simultaneous insertion into an armature core;

FIG. 47 shows the shape impressed on, or given to the distal ends of the conductors prior to assembly with a commutator; and FIG. 48 shows the spatial relationships of a core, preselected group of conductors, and a commutator as a preferred sequence of assembly process steps are completed.

Having thus described the method and apparatus for making armatures for electrodynamic machines of the present invention in detail and by reference to preferred embodiments thereof, it will be apparent that modifications and variations are possible without departing from the scope of the invention defined in the appended claims.

What is claimed is:

1. A method of making an armature for a dynamoelectric machine comprising the steps of:

simultaneously moving a defined plurality of hairpin conductors into upper twist tooling;

operating said upper twist tooling to rotate legs of said hairpin conductors adjacent end turns of said hairpin conductors to displace said legs in opposite directions relative to one another by a defined angular displacement corresponding to said upper twist and thereby changing the conductors to frog leg conductors having a spread-legged configuration;

removing said plurality of frog leg conductors from said upper twist tooling;

inserting said frog leg conductors into an armature core defining a plurality of conductor receiving slots corresponding to said defined plurality around the periphery thereof;

driving said frog leg conductors through said armature core to extend into lower twist tooling positioned adjacent said armature core;

operating said lower twist tooling to rotate the distal ends of the legs of said frog leg conductors to displace said legs in opposite directions relative to one another by a defined angular displacement corresponding to said lower twist; and pressing a commutator onto said armature core to receive the distal ends of the legs of said frog leg conductors.

2. A method of making an armature for a dynamoelectric machine as claimed in claim 1 wherein the step of simultaneously moving a defined plurality of hairpin conductors into upper twist tooling comprises the steps of:

preforming said defined plurality of hairpin conductors;

loading said defined plurality of hairpin conductors into a magazine having a corresponding defined plurality of conductor receiving ports formed into the periphery thereof;

positioning said magazine adjacent said upper twist tooling; and inserting a defined plurality of stripper blades into the conductor receiving ports of said magazine to move said defined plurality of hairpin conductors into said upper twist tooling.

3. A method of making an armature for a dynamoelectric machine as claimed in claim 2 further comprising the steps of:

engaging said magazine; and moving said magazine to a return position after said conductors have been removed therefrom.

4. A method of making an armature for a dynamoelectric machine as claimed in claim 3 further comprising the step of moving said magazine away from said upper twist tooling to totally remove said conductors prior to moving said magazine to said return position.

5. A method of making an armature for a dynamoelectric machine as claimed in claim 1 wherein the step of removing said plurality of frog leg conductors from said upper twist tooling comprises the steps of:

inserting a defined plurality of stripper blades into said upper twist tooling to move said defined plurality of conductors out of said upper twist tooling; and clamping said conductors in conductor engaging fingers, said conductors being supported by said conductor engaging fingers.

6. A method of making an armature for a dynamoelectric machine as claimed in claim 1 further comprising the step of:

inserting the distal ends of said frog leg conductors into alignment means prior to inserting said frog leg conductors into an armature core for forcing the distal ends of said conductors together and into proper alignment for insertion into an armature core.

7. A method of making an armature for a dynamoelectric machine as claimed in claim 1 wherein the step of inserting said conductors into an armature core comprises the steps of:

engaging the end turns of said conductors; and applying an inserting force thereto.

8. A method of making an armature for a dynamoelectric machine as claimed in claim 1 wherein the step of inserting said conductors into an armature core comprises the steps of:

engaging the end turns of said conductors;

applying an inserting force thereto to partially insert said conductors into said armature core;

clamping said conductors by clamping fingers at a position spaced from said end turns; and applying an inserting force to said conductors via said clamping fingers.

9. A method of making an armature for a dynamoelectric machine as claimed in claim 1 wherein the step of operating said upper twist tooling comprises the steps of:

operating said upper twist tooling in a first direction to rotate the legs of said hairpin conductors adjacent end turns thereof to displace said legs in opposite directions relative to one another by an angular displacement exceeding said defined angular displacement corresponding to said upper twist and thereby changing the conductors to a frog leg spread-legged configuration; and operating said upper twist tooling in a second direction opposite to said first direction to return the legs of said conductors adjacent end turns thereof to said defined angular displacement and thereby stably displace said legs adjacent said end turns by said defined angular displacement corresponding to said upper twist.

10. A method of making an armature for a dynamoelectric machine as claimed in claim 9 wherein the step of operating said upper twist tooling in said first direction is performed to displace said legs by a circumferential distance corresponding to $x+1$ slots of said armature core; and, the step of operating said upper twist tooling in said second direction is performed to displace said legs by a circumferential distance corresponding to 1 slot of said armature core, x being equal to the defined angular displacement corresponding to said upper twist in terms of slots of said armature core.

11. A method of making an armature for a dynamoelectric machine as claimed in claim 1 wherein the step of operating said lower twist tooling comprises the steps of:

monitoring the circumferential positioning of said armature core;

operating said lower twist tooling to displace the legs of said conductors adjacent distal ends thereof in opposite directions relative to one another, said armature core being circumferentially displaced by operating said lower twist tooling, and said legs being rotated until said armature core is angularly displaced by a defined circumferential distance;

clamping said armature core; and operating said lower twist tooling until the legs of said conductors adjacent distal ends thereof are displaced relative to one another by said defined angular displacement corresponding to said lower twist.

12. A method of making an armature for a dynamoelectric machine comprising the steps of:

preforming an armature core defining a plurality of conductor receiving slots around the periphery thereof;

preforming a plurality of hairpin conductors each having two legs interconnected by an end turn;

preforming a commutator adapted to be received by said core;

preforming a magazine having a plurality of conductor receiving ports formed into the periphery thereof;

loading said plurality of hairpin conductors into said magazine;

placing a loaded magazine onto a first position of a turntable at a first operator's station of said system, said first position of said turntable including upper twist tooling;

rotating said turntable one position such that said loaded magazine at said first position of said turntable is moved to a second station of said system and a second position of said turntable is moved to said first station of said system;

simultaneously loading said plurality of hairpin conductors into said upper twist tooling from said magazine;

rotating said turntable one position such that said loaded upper twist tooling at said first position of said turntable is moved to a third station of said system, said second position of said turntable is moved to said second station of said system, and a third position of said turntable is moved to said first station of said system, said third position of said turntable including lower twist tooling;

placing said armature core onto said third position of said turntable;

operating said upper twist tooling to rotate the legs of said hairpin conductors adjacent the end turns thereof to displace said legs in opposite directions relative to one another by a defined angular displacement corresponding to said upper twist;

removing said plurality of conductors from said upper twist tooling;

rotating said turntable one position such that said first position of said turntable is moved to a fourth station of said system, said second position of said turntable is moved to said third station of said system, said third position of said turntable is moved to said second station of said system, and a fourth position of said turntable is moved to said first station of said system, said plurality of conductors being retained at said third station of said system;

placing said commutator onto said fourth position of said turntable;

rotating said turntable one position such that said first position of said turntable is moved to said first station of said system, said second position of said turntable is moved to said fourth station of said system, said third position of said turntable is moved to said third station of said system, and said fourth position of said turntable is moved to said second station of said system, said armature core at said third position of said turntable being positioned adjacent said plurality of conductors at said third station of said system;

inserting said plurality of conductors into said armature core;

driving said conductors through said armature core to partially extend into said lower twist tooling positioned adjacent said armature core;

rotating said turntable one position such that said first position of said turntable is moved to said second station of said system, said second position of said turntable is moved to said first station of said system, said third position of said turntable is moved to said fourth station of said system, and said fourth position of said turntable is moved to said third station of said system, said conductors being extended fully through said armature core and fully into said lower twist tooling at said fourth station of said system;

operating said lower twist tooling to rotate the distal ends of the legs of said conductors to displace said legs in opposite directions relative to one another by a defined angular displacement corresponding to said lower twist;

removing said conductors from said lower twist tooling;

rotating said turntable one position such that said first position of said turntable is moved to said third station of said system, said second position of said turntable is moved to said second station of said system, said third position of said turntable is moved to said first station of said system, and said fourth position of said turntable is moved to said fourth station of said system, said commutator being positioned adjacent said armature at said fourth station of said system;

pressing said commutator onto said armature core to receive the distal ends of the legs of said plurality of conductors and thereby complete said armature;

rotating said turntable one position such that said first position of said turntable is moved to said fourth station of said system, said second position of said turntable is moved to said third station of said system, said third position of said turntable is moved to said second station of said system, and said fourth position of said turntable is moved to said first station of said system; and removing said completed armature from said system at said first operator's station.

13. A method of making an armature for a dynamoelectric machine as claimed in claim 12 wherein said second position of said turntable comprises alignment means for forcing the distal ends of said conductors together and into proper alignment for insertion into said armature core, and said method further comprises the step of inserting distal ends of said conductors into said alignment means prior to inserting said conductors into said armature core.

14. A method of making an armature for a dynamoelectric machine as claimed in claim 12 further comprising the steps of:

engaging said magazine; and moving said magazine to a return position after said conductors have been removed therefrom.

15. A method of making an armature for a dynamoelectric machine as claimed in claim 14 further comprising the step of moving said magazine away from said upper twist tooling to totally remove said conductors prior to moving said magazine to said return position.

16. A method of making an armature for a dynamoelectric machine as claimed in claim 12 wherein the step of removing said plurality of conductors from said upper twist tooling comprises the steps of:

inserting a plurality of stripper blades into said upper twist tooling to move said plurality of conductors out of said upper twist tooling; and clamping said conductors in conductor engaging fingers, said conductors being supported by said conductor engaging fingers.

17. A method of making an armature for a dynamoelectric machine as claimed in claim 12 wherein the step of inserting conductors into an armature core comprises the steps of:

engaging the end turns of said conductors; and applying an inserting force thereto.

18. A method of making an armature for a dynamoelectric machine as claimed in claim 12 wherein the step of inserting conductors into an armature core comprises the steps of:

engaging the end turns of said conductors;

applying an inserting force thereto to partially insert said conductors into said armature core;

clamping said conductors by clamping fingers at a position spaced from said end turns; and applying an inserting force to said conductors via said clamping fingers.

19. A method of making an armature for a dynamoelectric machine as claimed in claim 12 wherein the step of operating said upper twist tooling comprises the steps of:

operating said upper twist tooling in a first direction to rotate the legs of said hairpin conductors adjacent end turns thereof to displace said legs in opposite directions relative to one another by an angular displacement exceeding said defined angular displacement corresponding to said upper twist; and operating said upper twist tooling in a second direction opposite to said first direction to return the legs of said conductors adjacent end turns thereof to said defined angular displacement corresponding to said upper twist and thereby stably displace said legs adjacent said end turns by said defined angular displacement corresponding to said upper twist.

20. A method of making an armature for a dynamoelectric machine as claimed in claim 19 wherein the step of operating said upper twist tooling in said first direction is performed to displace said legs by a circumferential distance corresponding to x+1 slots of said armature core; and, the step of operating said upper twist tooling in said second direction is performed to displace said legs by a circumferential distance corresponding to 1 slot of said armature core, x being equal to the defined angular displacement corresponding to said upper twist in terms of slots of said armature core.

21. A method of making an armature for a dynamoelectric machine as claimed in claim 12 wherein the step of operating said lower twist tooling comprises the steps of:

monitoring the circumferential positioning of said armature core;

operating said lower twist tooling to displace the legs of said conductors adjacent distal ends thereof in opposite directions relative to one another, said armature core being circumferentially displaced by operating said lower twist tooling, and said legs being rotated until said armature core is angularly displaced by a defined circumferential distance;

clamping said armature core; and operating said lower twist tooling until the legs of said conductors adjacent distal ends thereof are displaced relative to one another by said defined angular displacement corresponding to said lower twist.

22. A method of making an armature for a dynamoelectric machine comprising the steps of:

simultaneously confining a preselected number of hairpin conductors in first tooling;

operating said first tooling to reconfigure legs of said hairpin conductors adjacent end turns of said hairpin conductors and displace said legs in opposite directions relative to one another by a defined angular displacement thereby to transform each hairpin conductor into a frog leg spread-legged conductor;

transferring the plurality of transformed conductors from said first tooling into an armature core defining a plurality of conductor receiving slots corresponding to said preselected number around the periphery thereof;

driving the legs of said transformed conductors through said armature core to extend into second tooling positioned adjacent said armature core;

operating said second tooling to reconfigure the distal ends of the legs of said transformed conductors and to displace said legs in opposite directions relative to one another by a defined angular displacement; and pressing a commutator onto said armature core to receive the distal ends of the legs of said transformed conductors.

* * * * *